(12) United States Patent
Moritoki

(10) Patent No.: US 7,882,305 B2
(45) Date of Patent: Feb. 1, 2011

(54) STORAGE APPARATUS AND DATA MANAGEMENT METHOD IN STORAGE APPARATUS

(75) Inventor: Naoki Moritoki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 502 days.

(21) Appl. No.: 11/968,354

(22) Filed: Jan. 2, 2008

(65) Prior Publication Data
US 2008/0276040 A1    Nov. 6, 2008

(30) Foreign Application Priority Data
May 2, 2007    (JP)    ............................. 2007-121656

(51) Int. Cl.
*G06F 13/00*    (2006.01)
(52) U.S. Cl. ....................... 711/113; 711/162
(58) Field of Classification Search .................. 711/113, 711/162
See application file for complete search history.

(56) References Cited

U.S. PATENT DOCUMENTS

| 5,860,083 A | 1/1999 | Sukegawa |
| 7,093,089 B2 * | 8/2006 | de Brebisson ............... 711/162 |
| 2005/0144486 A1 * | 6/2005 | Komarla et al. ............. 713/300 |
| 2007/0239938 A1 * | 10/2007 | Pong .......................... 711/122 |
| 2007/0288692 A1 * | 12/2007 | Bruce et al. ................. 711/113 |
| 2008/0091876 A1 * | 4/2008 | Fujibayashi et al. ......... 711/113 |

FOREIGN PATENT DOCUMENTS

| JP | 6-236241 | 8/1994 |
| JP | 10-154101 | 6/1998 |

* cited by examiner

*Primary Examiner*—Jared I Rutz
(74) *Attorney, Agent, or Firm*—Brundidge & Stanger, P.C.

(57) ABSTRACT

Provided are a storage apparatus and its data management method capable of preventing the loss of data retained in a volatile cache memory even during an unexpected power shutdown. This storage apparatus includes a cache memory configured from a volatile and nonvolatile memory. The volatile cache memory caches data according to a write request from a host system and data staged from a disk drive, and the nonvolatile cache memory only caches data staged from a disk drive. Upon an unexpected power shutdown, the storage apparatus immediately backs up the dirty data and other information cached in the volatile cache memory to the nonvolatile cache memory.

13 Claims, 20 Drawing Sheets

FIG.5

| DATA IDENTIFIER | TOP LOGICAL ADDRESS | DATA LENGTH | LAST ACCESS TIME | FREQUENCY VALUE |
|---|---|---|---|---|
| aaaa | a000 | 5000 | 00:10:00 | +4 |
| bbbb | a001 | 8000 | 02:30:00 | 0 |
| cccc | a002 | 20000 | 00:03:00 | +11 |
| dddd | a003 | 1000 | 10:00:00 | −3 |
| : | : | : | : | : |

FIG.6A

| NONVOLATILE CACHE MEMORY ADDRESS | BLOCK NUMBER | REWRITE COUNT |
|---|---|---|
| y000 | 0 | 1005 |
| y001 | 1 | 0720 |
| y002 | 2 | 0042 |
| y003 | 3 | 0432 |
| : | : | : |
| y00n | n | 3017 |

FIG.6B

| NONVOLATILE CACHE MEMORY ADDRESS | BLOCK NUMBER | REWRITE COUNT |
|---|---|---|
| y000 | 0 | 2506 |
| y001 | | |
| y002 | 1 | 507 |
| y003 | | |
| y004 | 2 | 87 |
| y005 | | |
| : | : | : |

FIG.6C

| NONVOLATILE CACHE MEMORY ADDRESS | BLOCK NUMBER | REWRITE COUNT |
|---|---|---|
| y000 | 0 | 4637 |
| | 1 | 604 |
| | 2 | 2461 |
| y001 | 3 | 864 |
| | 4 | 1655 |
| | 5 | 620 |
| : | : | : |
| | : | : |
| | : | : |

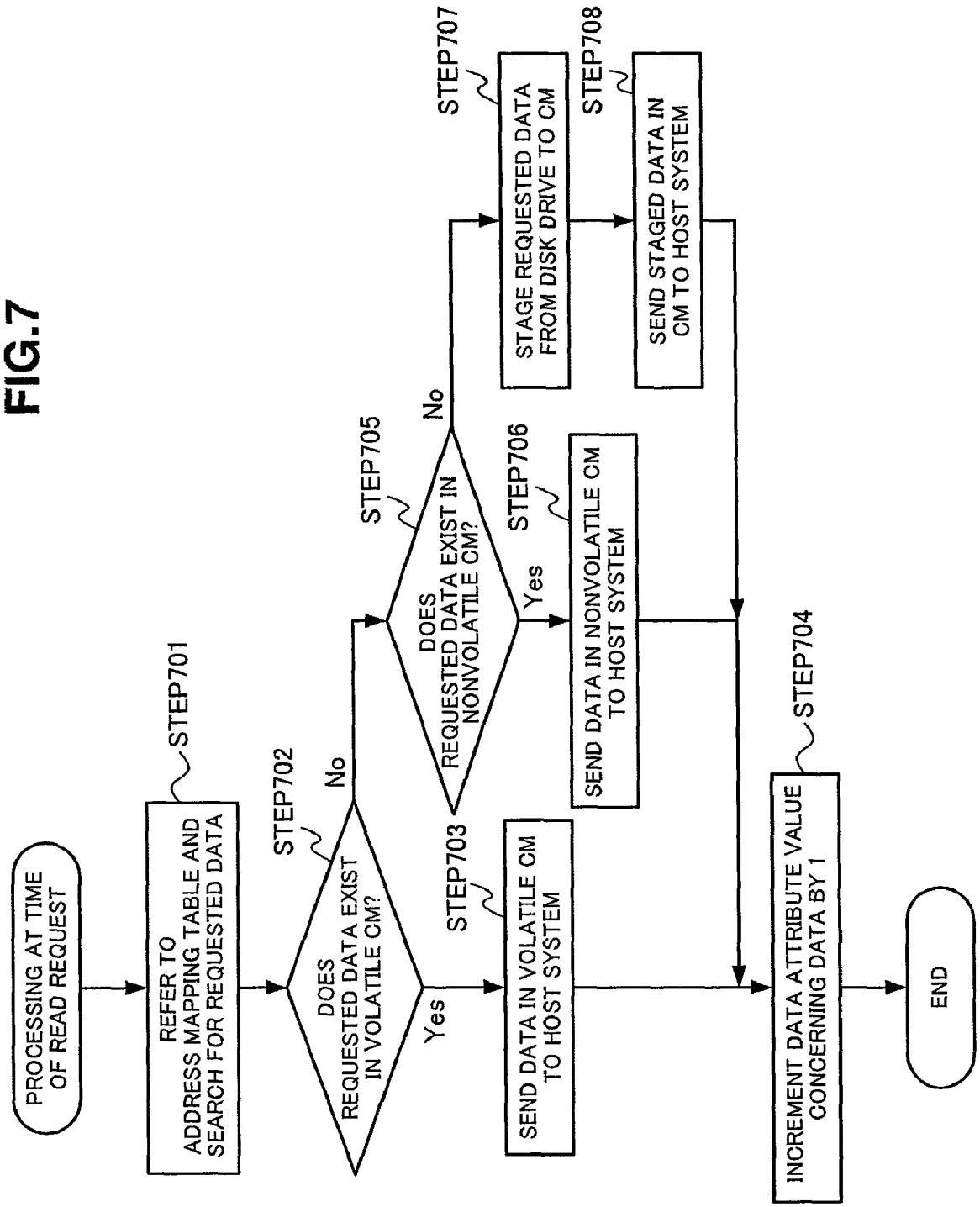

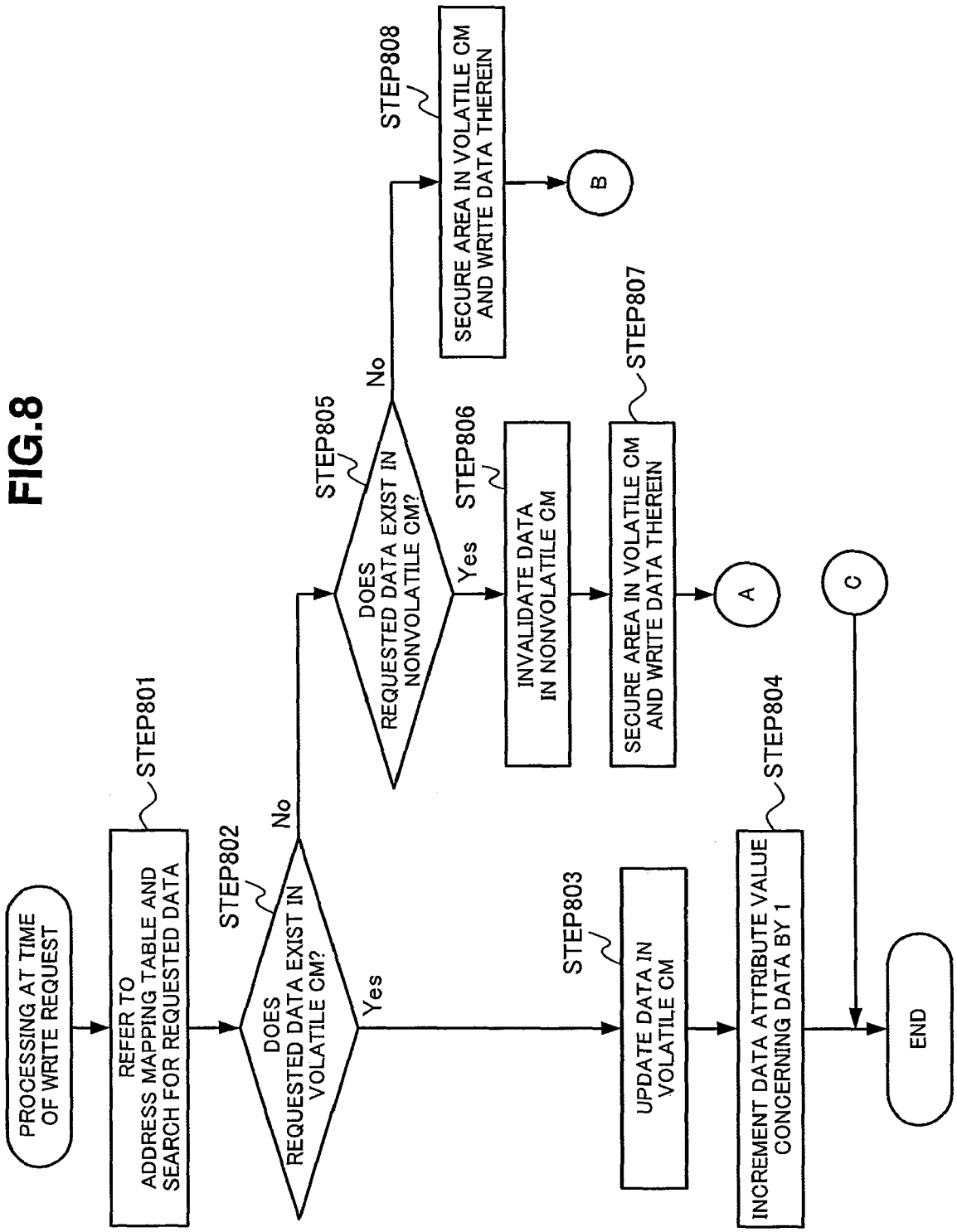

STORAGE APPARATUS AND DATA MANAGEMENT METHOD IN STORAGE APPARATUS

CROSS REFERENCES

This application relates to and claims priority from Japanese Patent Application No. 2007-121656, filed on May 2, 2007, the entire disclosure of which is incorporated herein by reference.

BACKGROUND

The present invention generally relates to a storage apparatus and a method of managing data in a storage apparatus, and particularly relates to technology for managing cache data in such a storage apparatus.

A storage apparatus (which may be called a storage subsystem) generally comprises a cache memory in view of system performance and the like. A cache memory is typically configured from a volatile memory such as a DRAM. A large-scale storage apparatus equipped with large-capacity hard disk drives is mounted with a large-capacity cache memory in the order of several to several tens of gigabytes, and thus, during its operation, caches data therein and replies to I/O access requests to a host system. Accordingly, such a storage apparatus, in order to prevent the loss of data in the cache memory due to an unexpected power shutdown, temporarily supply power from a battery as a secondary power source to maintain the operating condition during an unexpected power shutdown, while data in the cache memory is destaged to (backed up in) a hard disk drive.

In recent years, enlargement of capacity and price-reduction of nonvolatile memories such as a flash memory have progressed, and, as a result, the usage of nonvolatile memories is growing. For example, Japanese Patent Laid-Open Publication No. H6-236241 (Patent Document 1) discloses a hard disk device in which a cache memory is partially configured from a flash memory. In other words, with Patent Document 1, data in an area that is frequently accessed in the hard disk is placed in the flash memory. Patent Document 1 thereby eliminates the movement of the disk head as much as possible upon accessing data access, increases the access efficiency, and prevents the loss of cache data due to a power shutdown.

Further, Japanese Patent Laid-Open Publication No. H10-154101 (Patent Document 2) discloses a data storage system that causes a semiconductor disk device configured from EEPROM to function as a cache memory for a hard disk drive. Specifically, with Patent Document 2, information required for booting the operating system and frequently used application programs is stored in the semiconductor disk device, and the cache function is thereby effectively exhibited even immediately after the power is turned on.

With a large-scale storage apparatus, during its operation, large volumes of data exist in the cache memory without being destaged to the hard disk drive. Accordingly, it is necessary to prepare measures so that data is not lost even during emergencies such as a power shutdown.

With the conventional data backup system during emergencies using a battery, the storage apparatus has needed to be equipped with a considerable load of batteries, which are relatively expensive, in order to continue driving the hard disk drive, and costs tended to pile up. Thus, it is necessary to reduce the power consumption as low as possible in order to prolong the drive with a small load of batteries, but it is difficult to effectively reduce the power consumption since the backup destination of data is set to be the hard disk drive.

Further, nonvolatile memories as represented with a flash memory have a limited deletion/rewrite count in a block (area) because of its structure. Thus, when a nonvolatile memory is to be used as a cache memory of a hard disk drive to which a write access is frequently made, it is necessary to control the write access so that it will not be concentrated on a specific block. Accordingly, as a real issue, it is difficult to actively use a nonvolatile memory as the cache memory in the storage apparatus.

Furthermore, even in a case where the cache memory is partially configured from a nonvolatile memory, there is a problem in that the data stored in a volatile cache memory would be lost unless it is backed up in a hard disk drive during emergencies such as a power shutdown. Thus, if data stored in a volatile cache memory is backed up in a hard disk drive during emergencies such as a power shutdown, this would ultimately result in the problem of power consumption encountered in a conventional battery backup system.

SUMMARY

In view of the above, an object of the present invention is to prevent the loss of data by effectively and reliably storing data retained in a volatile cache memory under a secondary power source even in a case when an urgent backup request arises during a power shutdown or the like, and thereby reduce the power consumption of the secondary power source.

Another object of the present invention is to stop the delivery of power to the hard disk drive and reduce power consumption by effectively using a nonvolatile cache memory.

The present invention was made to achieve the foregoing objects.

In one aspect of the present invention, a storage apparatus of the present invention comprises a disk drive having a storage medium for storing a plurality of data sets, and a disk controller configured to control the disk drive. The disk controller includes a host interface configured to receive an I/O request from a host system, a disk interface operatively connected to the disk drive, and a cache mechanism operatively connected to the host interface and the disk interface and having a first cache memory configured from a volatile memory and a second cache memory configured from a nonvolatile memory. The disk controller is configured to manage attribute values respectively associated with the plurality of data sets stored in the disk drive.

Further, the disk interface writes a first data set specified from the plurality of data sets stored in the disk drive into the second cache memory based on the attribute values.

Then, in accordance with a backup request, the disk controller transfers a second data set specified from the data set group written in the first cache memory to the second cache memory.

In one aspect of the present invention, a storage apparatus of the present invention comprises a disk drive having a storage medium for storing a plurality of data sets, and a disk controller configured to control the disk drive. The disk controller includes a processor, a host interface controlled by the processor for receiving an I/O request from a host system, a disk interface controlled by the processor and operatively connected to the disk drive, and a cache mechanism operatively connected to the host interface and the disk interface and having a first cache memory configured from a volatile memory and a second cache memory configured from a nonvolatile memory. The disk controller is configured to manage attribute values respectively associated with the data set group stored in the disk drive.

Further, the processor controls the disk interface so that a first data set specified from the plurality of data sets stored in the disk drive is written into the second cache memory based on the attribute values.

Then, in accordance with a backup request, the disk controller transfers a second data set specified from the plurality of data sets written in the first cache memory to the second cache memory.

In one aspect of the present invention, the present invention is directed to a method of managing data in a storage apparatus including a disk drive having a storage medium for storing a data set group, and a disk controller configured to control the disk drive. Specifically, the method of the present invention comprises: providing a first cache memory configured from a volatile memory and a second cache memory configured from a nonvolatile memory; giving attribute values to each of the plurality of data sets stored in the disk drive; writing a first data set in the first cache memory; specifying a second data set from the plurality of data sets stored in the disk drive based on attribute values given to each of the stored data sets; writing the specified data set into the second cache memory; determining, upon receiving a write request from a host system, whether a corresponding data set to the data set according to the write request has been written as the second data set into the second cache memory; invalidating an area in which the second data set was written in the second cache memory when it is determined that a data set corresponding to the data set according to the write request has been written as the second data set into the second cache memory; writing a new data set to be specified based on the attribute values into the invalidated area in the second cache memory; and transferring, in accordance with a backup request, the first data set written into the first cache memory to the second cache memory.

In one aspect of the present invention, the present invention is directed to a method of managing data in a storage apparatus including a plurality of disk drives having a storage medium for storing a data set, and a disk controller configured to the plurality of disk drives. The method comprises: a storing different data sets to each of the plurality of disk drives; giving prescribed attribute values to each of the data sets; rearranging each of the data sets in the plurality of disk drives based on the given prescribed attribute values; specifying at least one disk drive among the plurality of disk drives; writing all of data sets rearranged in the at least one specified disk drive into a cache memory configured from a nonvolatile memory; and stopping power delivery to the at least one specified disk drive.

According to the present invention, because 'clean data' is stored in the nonvolatile memory configuring a part of the cache memory, this nonvolatile memory can be effectively used as a backup destination during emergency situations.

Further, according to the present invention, because the nonvolatile memory is used as the backup destination during emergency situations in substitute for a hard disk drive, it is possible to suppress the power consumption, and, accordingly, reduce the load of batteries to be mounted as the secondary power source.

Moreover, according to the present invention, because all data stored in a specific disk drive are staged to a nonvolatile cache memory, and the delivery of power to such specific disk drive is stopped, a high cache hit ratio can be expected, and it is thereby possible to improve the system performance as well as reduce the power consumption.

DESCRIPTION OF DRAWINGS

FIG. 5 is a diagram showing an exemplary data attribute management table in a storage apparatus according to an embodiment of the present invention.

FIG. 6A to FIG. 6C are diagrams showing an exemplary rewrite count management table in a storage apparatus according to an embodiment of the present invention.

FIG. 7 is a flowchart explaining processing at the time of a read request in a storage apparatus according to an embodiment of the present invention.

FIG. 8 is a flowchart explaining processing at the time of a write request in a storage apparatus according to an embodiment of the present invention.

DETAILED DESCRIPTION

Embodiments of the present invention will be explained below with reference to the attached drawings.

The present invention takes particular note that data (data sets) in a cache memory in a storage apparatus could become a so-called 'dirty' state or a so-called 'clean' state, and is characterized in that the data to be cached is optimally arranged in either a volatile cache memory or a nonvolatile cache memory according to the status thereof. Here, dirty data refers to data in a state where data in the cache memory is inconsistency with (i.e., does not match) the corresponding data in the hard disk drive. Typically, data in the cache memory becomes dirty data when data in the cache memory is updated according to a write request from the host system, but the corresponding data in the hard disk drive is not yet updated. On the other hand, clean data refers to data in a state where data in the cache memory is consistent with the corresponding data in the hard disk drive.

Specifically, this embodiment is directed to a storage apparatus configured to include a cache memory configured from a volatile and nonvolatile memory. The volatile cache memory caches data according to a write request from a host system and data staged from a disk drive, whereas the nonvolatile cache memory only caches data staged from a disk drive. In other words, because a write request from the host system creates dirty data, the storage apparatus caches data according to a write request from a host system in the volatile cache memory, and only caches clean data in the nonvolatile cache memory, thereby preparing for a read request from the host system.

By way of this, the nonvolatile memory that was conventionally prepared for the backup of data can be effectively used as a cache memory.

When an urgent backup request occurs due to a power shutdown or the like, the storage apparatus immediately backs up the dirty data and other information cached in the volatile cache memory to the nonvolatile cache memory. Further, if the storage apparatus comprises a shared memory configured from a volatile memory, likewise, the storage apparatus backs up the various types of information retained in the shared memory to the nonvolatile cache memory. Namely, only clean data is cached in the nonvolatile cache memory, and, because such data does not need to be separately backed up, contents of the nonvolatile cache memory can be overwritten with contents of the volatile cache memory.

By way of this, during emergency situations such as an unexpected power shutdown, only specific data among the data stored in the volatile cache memory need to be backed up, and thereby the backup process can be performed with low power consumption and at high speed.

Figure 1:
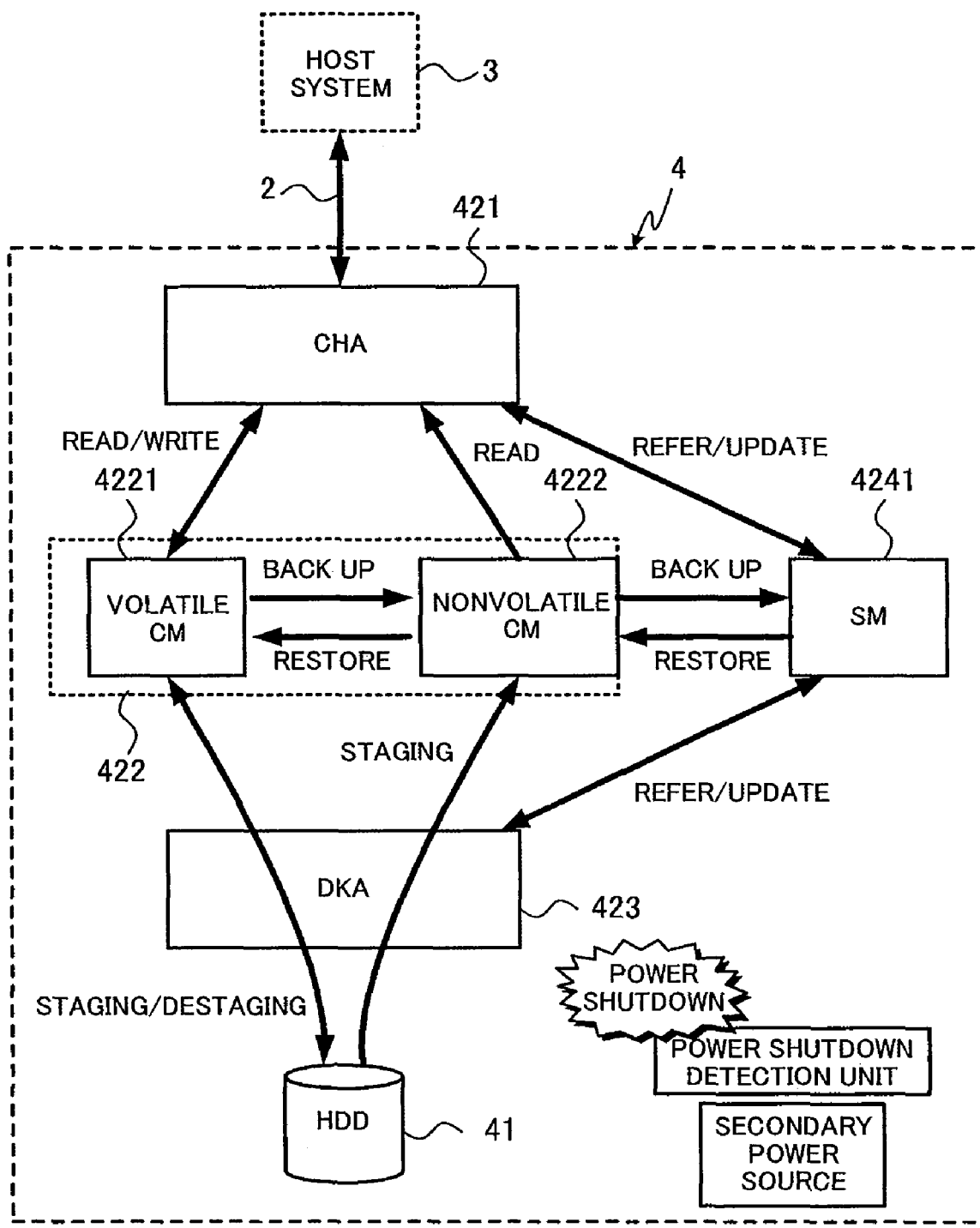
FIG. 1 is a conceptual diagram illustrating the backup/restoration mechanism of data in a storage apparatus according to an embodiment of the present invention.

FIG. 1 is a conceptual diagram explaining a backup/restoration mechanism of data in a storage apparatus according to an embodiment of the present invention.

As shown in FIG. 1, a computer system 1 is configured from a host system 3 and a storage apparatus 4 being interconnected via a channel 2.

The storage apparatus 4 comprises, among other things, a channel adapter (CHA) 421, a cache mechanism 422, a disk adapter (DKA) 423, and a shared memory (SM) 4241. The cache mechanism 422 is configured to include a volatile cache memory (VCM) 4221 and a nonvolatile cache memory (NVCM) 4222. These components or modules performs storing/reading data in/from a hard disk drive (HDD) 41 in response to an I/O access request from the host system 3 and providing such data to the host system 3, cooperating with each other. The specific configuration example and operational example of the storage apparatus 4 will be described later.

The volatile cache memory 4221 functions as a cache memory for reading/writing, whereas the nonvolatile cache memory 4222 functions as a read-only cache memory. Accordingly, when the channel adapter 421 receives a write request from the host system 3, the channel adapter 421 writes data according to the write request into the volatile cache memory 4222, and never writes data according to the write request into the nonvolatile cache memory 4221. Data read from the disk drive 41, under control of the disk adapter 423, is written in the nonvolatile cache memory 4221 based on an attribute value as described later.

More specifically, upon receiving an I/O request from the host system 3, the channel adapter 421 refers to the shared memory 4241 and then accesses either the volatile cache memory 4221 or the nonvolatile cache memory 4222. In processing of a read request, when the requested data does not exist in either the volatile cache memory 4221 or the nonvolatile cache memory 4222 (when it is a cache miss), the disk adapter 423 refers to the shared memory 4241, reads the requested data from the disk drive 41, writes (stages) the data into either the volatile cache memory 4221 or the nonvolatile cache memory 4222, and then updates the contents of the shared memory 4241. Whether to stage the requested data into the volatile cache memory 4221 or the nonvolatile cache memory 4222 will depend on the attribute given to that data. In processing of a write request, the channel adapter 421 writes the requested data into the volatile cache memory 4221, and then updates the contents of the shared memory 4241. In this case, when data corresponding to the requested data already exists in the nonvolatile cache memory 4221, the corresponding data is invalidated, and thereafter the requested data is written into the volatile cache memory 4221.

In the operation of the storage apparatus 4, for instance, if a power shutdown or a like occurs, the storage apparatus 4 backs up the data and management information written in the volatile cache memory 4221 to the nonvolatile cache memory 4222. The backup process is executed by a cache memory adapter (not shown) managing the cache memory mechanism. Data to be backed up does not have to be all data written in the volatile cache memory 4221, and it would suffice so as long as dirty data and its management information are backed up. The storage apparatus 4 also backs up the system configuration information and the like stored in the shared memory 4241 to the nonvolatile cache memory 4222.

When the situation of a power shutdown or the like is recovered, the storage apparatus 4 restores the data and other information backed up in the nonvolatile cache memory 4222 to the volatile cache memory 4221 and the shared memory 4241, respectively. By way of this, the storage apparatus 4 is restored to its status at the point in time the power shutdown occurred, thereby providing I/O services to the host system 3.

Figure 2:
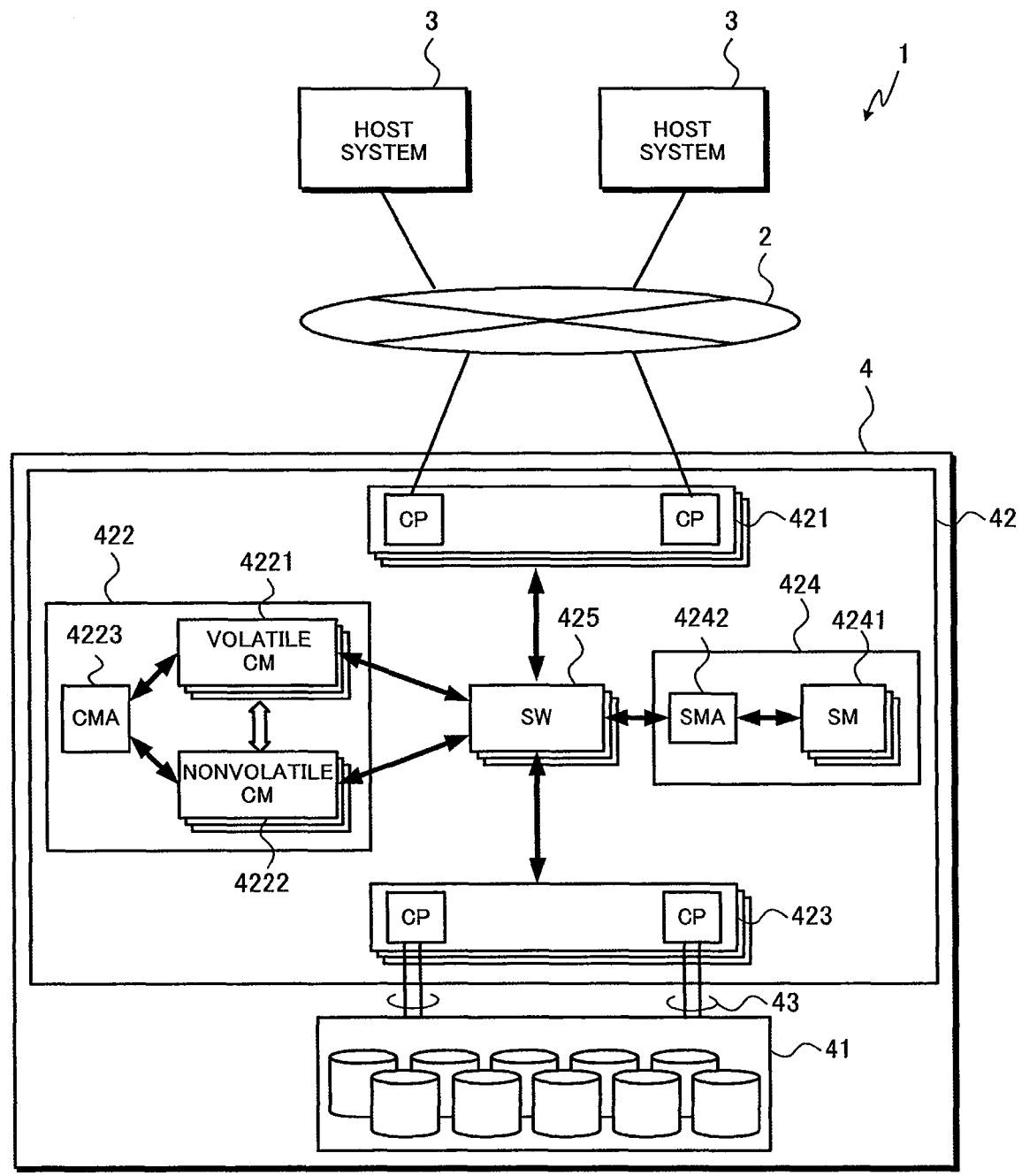
FIG. 2 is a diagram illustrating a configuration of a computer system including a storage apparatus according to an embodiment of the present invention.

FIG. 2 is a diagram explaining a configuration of a computer system including the storage apparatus according to an embodiment of the present invention. Referring to FIG. 2, the computer system 1 includes the host system 3 and the storage apparatus 4 operatively connected via the channel 2, and is configured as, for instance, a business system in a bank or a seat reservation system in an airline company.

The channel 2 is, for instance, a LAN, the Internet or a SAN (Storage Area Network), which may be configured to include a network switch, a hub, or the like. In this embodiment, channel 2 is configured by a SAN (FC-SAN) based on a fibre channel protocol.

The host system 3 is the core computer of, for instance, a business system in a bank or a seat reservation system in an airline company. Specifically, the host system 3 comprises hardware resources such as a processor, a main memory, a communication interface, and local I/O devices such as a keyboard and a display, and software resources such as device drivers, an operating system (OS), application programs (not shown). The host system 3 can achieve desired processing by executing various programs under the control of the processor in coordination with the hardware resources. For example, by execution business application programs in the OS under the control of the processor, the host system 3 is able to I/O-access the storage apparatuses 4 as explained in detail below, realizing the desired business system.

The storage apparatus 4 provides a storage area for storing data to the host system 3. The storage apparatus 4 comprises a plurality of disk drives 41 as physical devices (PDEV), and a disk controller (DKC) 42 configured to control I/O accesses such as writing into and reading from the disk drives 41. The disk drives 41 and the disk controller 42 are operatively connected via the disk channel 43.

The disk drives 41 include storage mediums such as hard disk drives or nonvolatile memories. The disk drives 41 may be configured as RAID (Redundant Arrays of Independence Disks). In a RAID configuration, several disk drives 41 configure one virtual device (VDEV), and one or more logical devices (LDEV) are defined on the virtual device. The logical devices are devices that can be recognized by the host system 3.

Logical units (LU) are associated with the logical devices. A logical unit number (LUN) is given to each logical unit. Further, a logical unit is divided into blocks, which are a minimum unit of I/O access, and each of blocks is allocated with a logical block address (LBA). Accordingly, the host system 3 can access data stored in a specific block in a specific logical unit by way of giving a logical address composed of an LUN and an LBA to the storage apparatus 4.

The disk controller 42 comprises a channel adapter (CHA) 421, a cache mechanism 422, a disk adapter (DKA) 423, and a shared memory (SM) board 424, and these components or modules are interconnected via an internal switch 425. These modules are formed in a redundant configuration.

The channel adapter 421 comprises a channel protocol device (CP) corresponding to the respective ports, and is a system circuit that serves as a host interface for conducting communication based on an I/O access request with the host system 3 operatively connected to the ports via the channel 2. The channel protocol device comprises a processor for performing protocol processing according to the individual protocols.

The cache mechanism 422 comprises a cache memory, and temporarily stores (caches) data to be exchanged between the host system 3 and the disk drive 51 in order to provide high system performance to the host system 3. In other words, the cache mechanism 422 is used for passing data between the channel adapter 421 and the disk adapter 423. In this embodiment, the cache memory of the cache mechanism 422 is composed of a volatile cache memory (first cache memory) 4221 such as a DRAM and a nonvolatile cache memory (second cache memory) 4222 such as a flash memory. The volatile cache memory 4221 and the nonvolatile cache memory 4222 are formed in a redundant configuration, respectively. In this specification, a mere reference to a "cache memory" shall mean a reference to both the volatile cache memory 4221 and the nonvolatile cache memory 4222.

The cache mechanism 422 also comprises a cache memory adapter (CMA) 4223. The cache memory adapter 4223 performs data control between the volatile cache memory 4221 and the nonvolatile cache memory 4222.

In this embodiment, the volatile cache memory 4221 is used for reading/writing data. In contrast, the nonvolatile cache memory 4222 is used only for reading data. Specifically, when the channel adapter 421 receives a write request from the host system 3, the channel adapter 421 writes data into the volatile cache memory 4221 according to the write request. Further, in staging operation based on a read request from the host system 3, the channel adapter 423 writes the data requested from the disk drive 41 into either the volatile cache memory 4221 or the volatile cache memory 4222. Accordingly, data to be cached in the nonvolatile cache memory 4222 will only be the data staged from the disk drive 41 with the disk adapter 423.

Additionally, in this embodiment, the configuration includes the volatile cache memory 4221 and the volatile cache memory 4222 in one cache mechanism 422. The configuration may also be such that the volatile cache memory 4221 and the volatile cache memory 4222 are included respectively in physically separated cache mechanisms. Further, the configuration may also be such that a cache memory adapter 4223 is not provided in the cache mechanism 422 and an external processor having an equivalent function performs this control.

The disk adapter 423 comprises a channel protocol device corresponding to the respective ports, and is a system circuit that serves as a disk interface for controlling the I/O access to the disk drive 41 operatively connected to the ports via the disk channel 43. Specifically, the disk adapter 523 extracts data from the cache memory in the cache mechanism 422 and then stores (i.e, destages) the data in the disk drive 41, or reads data from the disk drive 41 and the writes (i.e., stages) the data into the cache memory 522. For example, in a case where a read request from the host system 3 is received, and the requested data does not exist in either the volatile cache memory 4221 or the nonvolatile cache memory 4222, destaging is performed as necessary to ensure a cache area, and the requested data is subsequently staged in either the volatile cache memory 4221 or the nonvolatile cache memory 4222.

Figure 3:
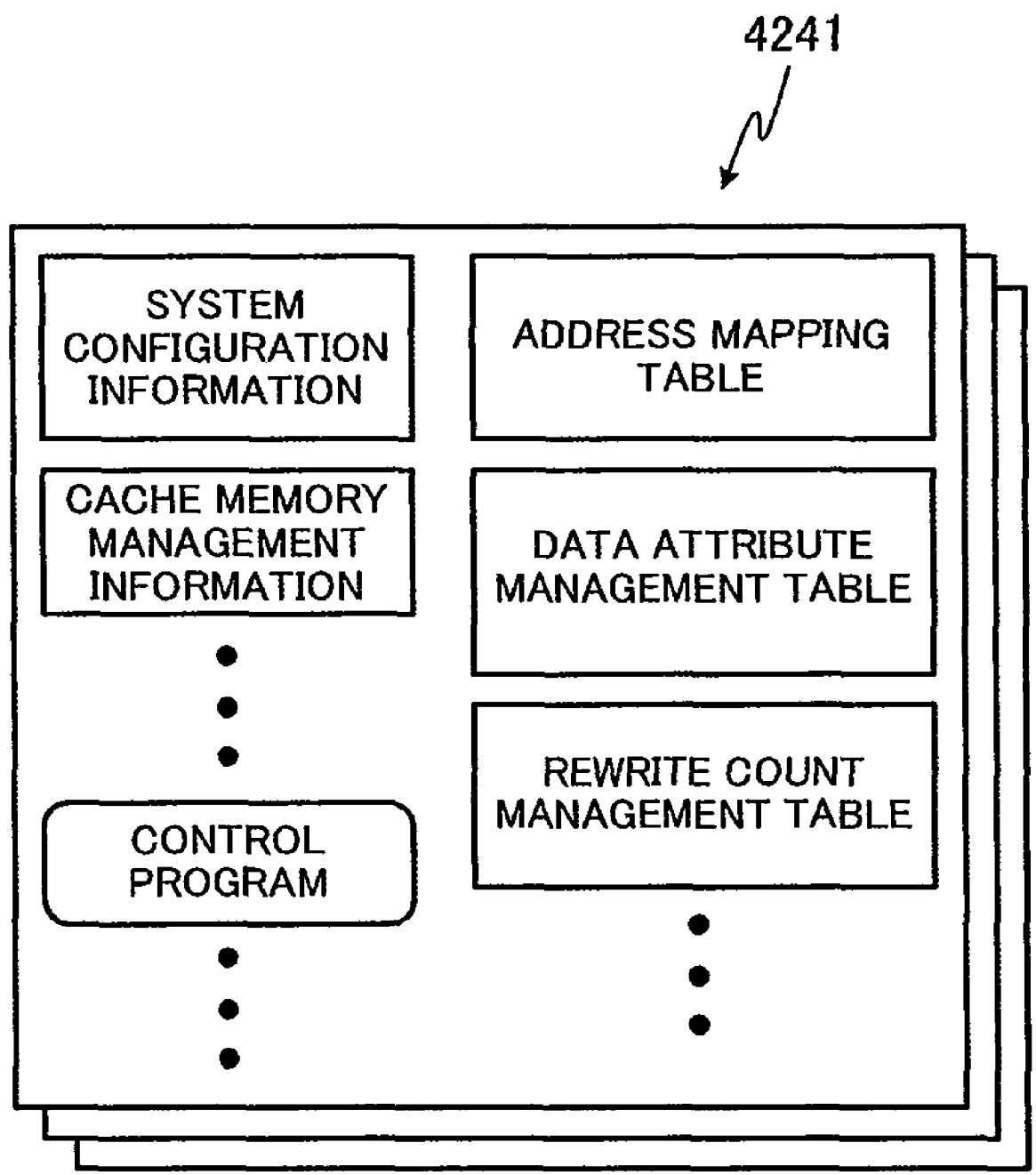
FIG. 3 is a diagram illustrating contents of a shared memory in a storage apparatus according to an embodiment of the present invention.

The shared memory board 424 includes a shared memory 4241 for storing various types of information to be referred to by the respective modules in the storage apparatus 4, and a shared memory adapter (SMA) 4242 for controlling such shared memory 4241. In this embodiment, the shared memory 4241 is configured from a volatile memory such as a DRAM. The shared memory 4241, for instance, as shown in FIG. 3, stores various types of information such as system configuration information, an address correspondence table, a data attribute management table, a rewrite count management table, and cache memory management information. The shared memory 4241 may also store various control programs to be used by the modules in the storage apparatus 4.

The system configuration information is information regarding the system configuration such as the configuration information of the respective modules in the storage apparatus 4 and version information of control programs that operate in the respective modules.

The address mapping table is directory information for managing in which storage area (logical block) of the disk drive 41 the data cached in the cache memory should be stored. Specifically, the directory information includes address management information, which is a result of associating a logical address to be recognized by the host system 3 regarding the data cached in the cache memory, and a cache memory address in the cache memory. In this embodiment, whether it is an address in the volatile cache memory 4221 or an address in the nonvolatile cache memory 4222 can be recognized based on the value of the cache memory address.

Accordingly, the channel adapter 421 is able to determine in which cache memory the data based on the I/O access request exists by referring to the address mapping table. Further, the channel adapter 421 is able to destage the data cached in the cache memory to the designated storage area in the disk drive 41 by referring to the address mapping table.

More specifically, in order to access data in the cache memory, the foregoing cache memory management information is referred to in addition to the address mapping table. When the channel adapter 421 stages data, the channel adapter 421 updates the address mapping table and the cache memory management information. Further, when the disk adapter 423 destages data, it updates the address mapping table and the cache memory management information.

The cache management information is configured from management information (volatile cache memory management information) for the volatile cache memory 4221 and management information (nonvolatile cache memory management information) for the nonvolatile cache memory 4222, and is meta information for managing the data cached in the respective cache memories. The upper limit of the data size that can be managed with cache memory management information per unit may be defined. Thus, data of a large size will be managed with cache management information of a plurality of units.

Returning to FIG. 2, the internal switch 425 is a switching device configured from a crossbar switch. The internal switch 425 arbitrates the competition of inputted data signals, switches the path of the data signals, thereby establishing a path between the source module and the destination module. The internal switch 425 may be a packet-switching device.

Figure 4:
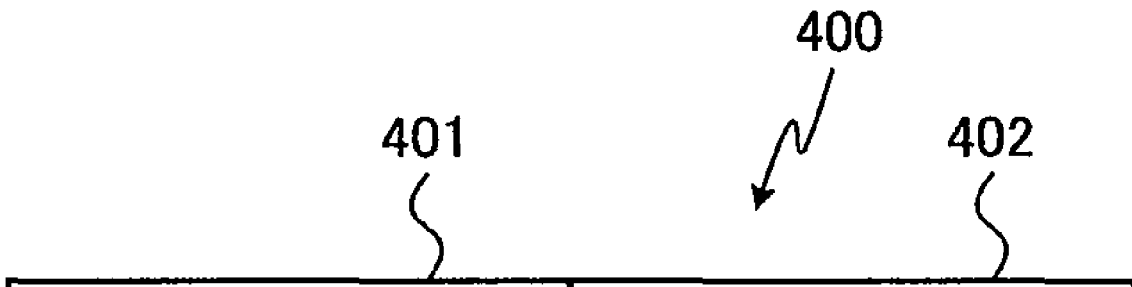
FIG. 4 is a diagram showing an exemplary address mapping table in a storage apparatus according to an embodiment of the present invention.

FIG. 4 is a diagram showing an example of an address mapping table 400 in the storage apparatus 4 according to an embodiment of the present invention.

As shown in FIG. 4, the address mapping table 400 includes a start logical address column 401 and a cache memory start address column 402. The start logical address column 401 shows a start logical address of the storage area in the disk drive 41 with respect to the data designated by the host system 3. The cache memory start address column 402 shows a start address of the block in the cache memory with respect to the designated data. In this embodiment, a value of an address indicates which the volatile cache memory 4221 or the nonvolatile cache memory 4222. In FIG. 4, the start addresses that begin with "x" indicate the addresses in the volatile cache memory 4221, and the start addresses that begin with "y" indicates the addresses in the nonvolatile cache memory 4222.

FIG. 5 is a diagram showing an exemplary data attribute management table 500 in the storage apparatus 4 according to an embodiment of the present invention. The data attribute management table 500 is stored in, for example, the shared memory 4241. In this embodiment, the data attribute management table 500 manages, as the data attribute, the frequency of I/O requests regarding the respective data to be stored in the disk drive 41.

Specifically, as shown in FIG. 5, the data attribute management table 500 includes a data name column 501, a start logical address column 502, a data length column 503, a last access time column 504, and a frequency value column 505.

The data name column 501 shows the identifier for uniquely identifying the application data in the host system 3. The start address column 502 shows a start address of the storage area (logical block) in the disk drive 41 storing the data, and the data length column 503 shows the length (size) of the data. The last access time column 504 shows the last time an I/O request to the data was made. The frequency value column 505 shows the number of I/O requests made to the data. As described above, when a read request is made to the data, the current frequency value is incremented by 1. When a write request is made, the current frequency value is decremented by 1. Further, regarding data to which no I/O access request is made for a given period of time, the current frequency value is decremented by 1, or the frequency value may be reset to 0. This is based on an empirical assumption that data without an I/O request for a long period of time will not receive an I/O request in the future. In doing so, data with a high frequency of read request will show a high frequency value. Accordingly, by way of referring to the frequency value, it is possible to determine which data should be staged to the nonvolatile cache memory 4222 to achieve an effective result.

FIG. 6A to FIG. 6C are diagrams showing exemplary rewrite count management tables 600 in the storage apparatus 4 according to an embodiment of the present invention. The rewrite count management table 600 is stored in, for example, the shared memory 4241. The rewrite count management table 600 manages the rewrite count to the respective blocks in the nonvolatile cache memory 4222.

FIG. 6A shows an example where the respective blocks in the nonvolatile cache memory 4222 are managed with one address. Further, FIG. 6B shows an example where the respective blocks are managed with a plurality of addresses. In other words, each address handled by the channel adapter 421 (and disk adapter 423) is referring to one block of the nonvolatile cache memory 4222. Further, FIG. 6C shows an example where a plurality of blocks are managed with one address. In other words, each address handled by the channel adapter 421 (and disk adapter 423) is referring to a plurality of blocks of the nonvolatile cache memory 4222.

FIG. 7 is a flowchart explaining the processing at the time of a read request in the storage apparatus 4 according to an embodiment of the present invention.

Referring to FIG. 7, when the channel adapter 421 receives a read request from the host system 3, the channel adapter 421 refers to the address mapping table 400 stored in the shared memory 4241, and the searches for data in the cache memory according to the read request (STEP 701). As a result, when the channel adapter 421 determines that the requested data exists in the volatile cache memory 4221 (STEP 702; Yes), the channel adapter 421 reads the data in the volatile cache memory 4221 and sends such data to the host system 3 (STEP 703). Then, the channel adapter 421 increments the frequency value regarding the data in the data attribute management table 500 by 1 (STEP 704).

When it is determined that the requested data does not exist in the volatile cache memory 4221 (STEP 702; No), and exists in the nonvolatile cache memory 4222 (STEP 705; Yes), the channel adapter 421 reads the data in the nonvolatile cache memory 4222 and sends such data to the host system 3 (STEP 706). Then, the channel adapter 421 increments the frequency value regarding the data in the data attribute management table 500 by 1 (STEP 704).

Like this, when the data according to the read request exists in either the volatile cache memory 4221 or the nonvolatile cache memory 4222, the channel adapter 421 can respond to such read request by reading the requested data therefrom.

When it is determined that the requested data does not exist in the volatile cache memory 4221 (STEP 702; No), and does not exist in the nonvolatile cache memory 4222 (STEP 705; No), the channel adapter 421 issues a command to the disk adapter 423, via the shared memory 4241, to stage the data according to the read request from the storage area of the disk drive 41. The disk adapter 423, based on such command, stages the requested data to the volatile cache memory 4221 (STEP 707). If there is no empty area in the volatile cache memory 4221 to which the data can be staged, an empty area can be ensured by destaging prescribed data according to, for example, an LRU algorithm. Further, when it is determined that the frequency value is high regarding the requested data, the disk adapter 423 may also stage the requested data to the nonvolatile cache memory 4222.

When the channel adapter 421 confirms that the requested data has been staged to the volatile cache memory 4221, it sends the requested data to the host system 3 (STEP 708). Then, the channel adapter 421 increments the frequency value regarding the data in the data attribute management table 500 by 1 (STEP 704).

As described above, upon receiving a read request from the host system 3, the channel adapter 421 reads the data according to the read request from either the volatile cache memory 4221 or the nonvolatile cache memory 4222, and sends the data to the host system 3.

Figure 9:
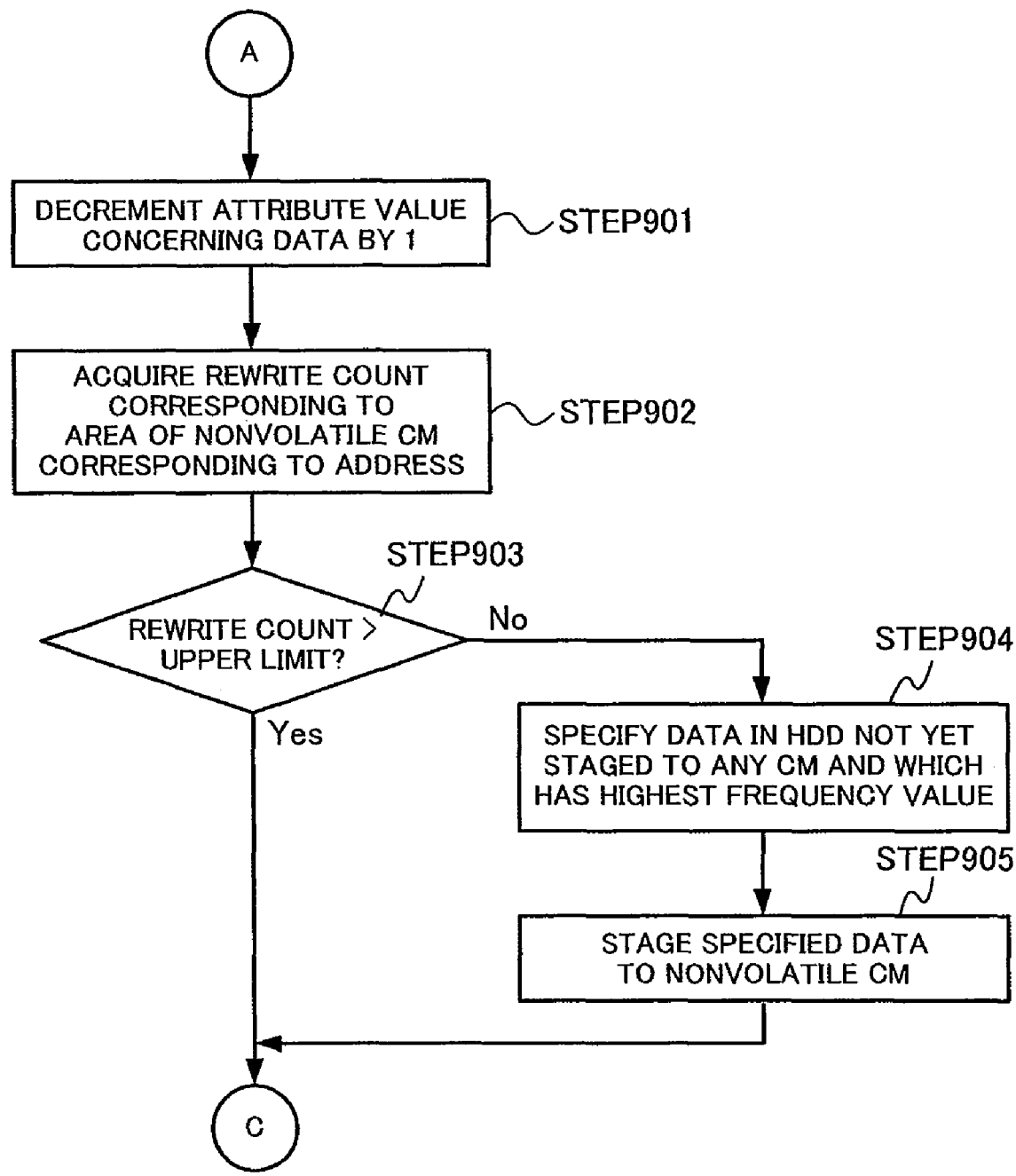
FIG. 9 is a flowchart explaining processing at the time of a write request in a storage apparatus according to an embodiment of the present invention.
Figure 10:
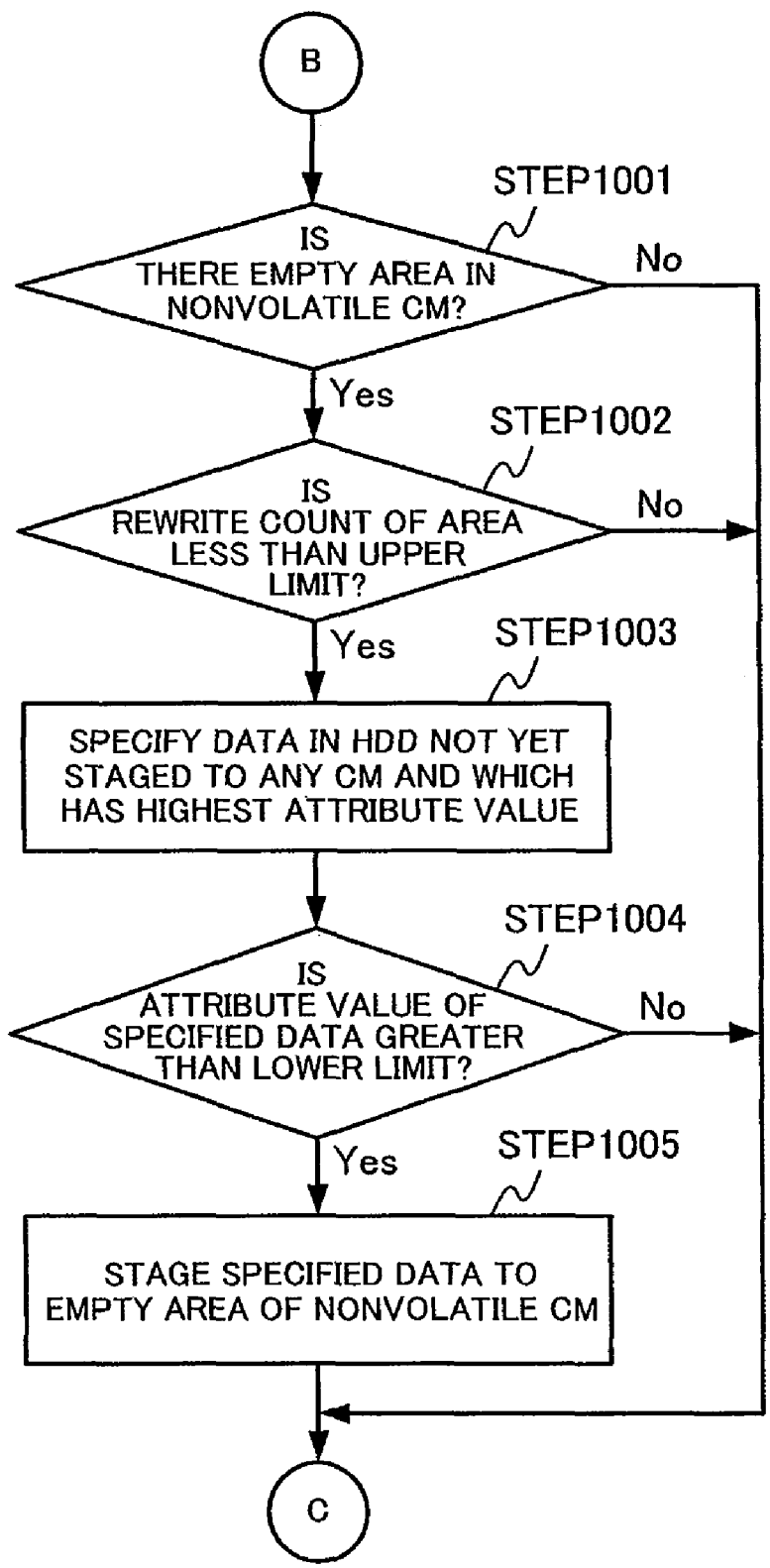
FIG. 10 is a flowchart explaining processing at the time of a write request in a storage apparatus according to an embodiment of the present invention.

FIG. 8 to FIG. 10 are flowcharts explaining the processing at the time of a write request in the storage apparatus 4 according to an embodiment of the present invention.

Referring to FIG. 8, when the channel adapter 421 receives a write request from the host system 3, the channel adapter 421 refers to the address mapping table 400 stored in the shared memory 4241, and searches for the data according to the write request in the cache memory (STEP 801). As a result, when the channel adapter 421 determines that the data exists in the volatile cache memory 4221 (STEP 802;Yes), the channel adapter 421 rewrites the data that has been cached in the volatile cache memory 4221 with the data according to the write request (STEP 803). Then, the channel adapter 421 decrements the frequency value regarding the data in the data attribute management table 500 by 1 (STEP 804).

Further, when it is determined that the requested data does not exist in the volatile cache memory 4221 (STEP 802; No), and exists in the nonvolatile cache memory 4222 (STEP 805; Yes), the channel adapter 421 invalidates the data in the nonvolatile cache memory 4221 (STEP 806). This is because data in the nonvolatile cache memory 4222 is read-only, and it will not be possible to maintain the consistency of data due to the write request. Subsequently, the channel adapter 421 ensures a cache area in the volatile cache memory 4221, and thereafter writes the data according to the write request in the cache area (STEP 807). If there is no empty area in the volatile cache memory 4221 to which the data can be staged an empty area can be secured by destaging prescribed data according to, for example, an LRU algorithm.

Subsequently, the channel adapter 421 decrements the frequency value regarding the data in the data attribute management table 500 by 1 (STEP 901 of FIG. 9). Further, the channel adapter 421 refers to the rewrite count management table 600 acquires the rewrite count corresponding to the area of the nonvolatile cache memory 4222 corresponding to the address designated by the write request (STEP 902). This is to prevent the use of an area in which the write count has reached the upper limit in light of the structural problem of the nonvolatile cache memory 4222.

The channel adapter 421 determines whether the acquired rewrite count exceeded the rewrite limit (STEP 903) or not, and, if the rewrite limit is exceeded, it ends this process (STEP 903;Yes). Contrarily, when the acquired rewrite count has not exceeded the rewrite limit (STEP 903; No), the channel adapter 421 specifies data in the disk drive 41 that has not been staged to the cache memory, and which has the highest frequency value (STEP 904). Then, the channel adapter 421 stages the specified data to the area of the nonvolatile cache memory 4222 (STEP 905).

When it is determined that the requested data does not exist in the volatile cache memory 4221 (STEP 802; No), and does not exist in the nonvolatile cache memory 4222 (STEP 805; No), the channel adapter 421 ensures a cache area in the volatile cache memory 4221, and then writes the data according to the write request into the cache area (STEP 808).

Subsequently, the channel adapter 421 refers to the cache management information for the nonvolatile cache memory and determines whether there is an empty area in the nonvolatile cache memory 4222 or not (STEP 1001 of FIG. 10). When the channel adapter 421 determines that there is an empty area (STEP 1001; Yes), the channel adapter 421 subsequently refers to the rewrite count management table 600, and further determines whether the rewrite count to the area is less than the upper limit or not (STEP 1002). This is to prevent the use of an area in which the write count has reached the upper limit in light of the structural problem of the nonvolatile cache memory 4222. When the channel adapter 421 determines that the write count to the area is less than the upper limit (STEP 1002; Yes), the channel adapter 421 specifies data in a storage area of the disk drive 41 that has not yet been staged to the cache memory, and which has the highest frequency value (STEP 1003).

The channel adapter 421 subsequently determines whether the frequency value of the specified data is greater than the lower limit or not (STEP 1004). This is to avoid giving consideration to the frequency value of I/O requests to data until reaching a certain frequency value because the tendency of I/O requests would not appear immediately after the system is booted where the frequency of I/O requests to the respective data would not be varied. When the channel adapter 421 determines that the frequency value of the specified data is greater than the lower limit (STEP 1005; Yes), the channel adapter 421 stages the specified data from the storage area in the disk drive 41 to the empty area in the nonvolatile cache memory 4222 (STEP 1006).

The backup processing in emergency situations in the storage apparatus 4 and the restoration processing after such back according to an embodiment of the present invention are now explained.

Figure 11:
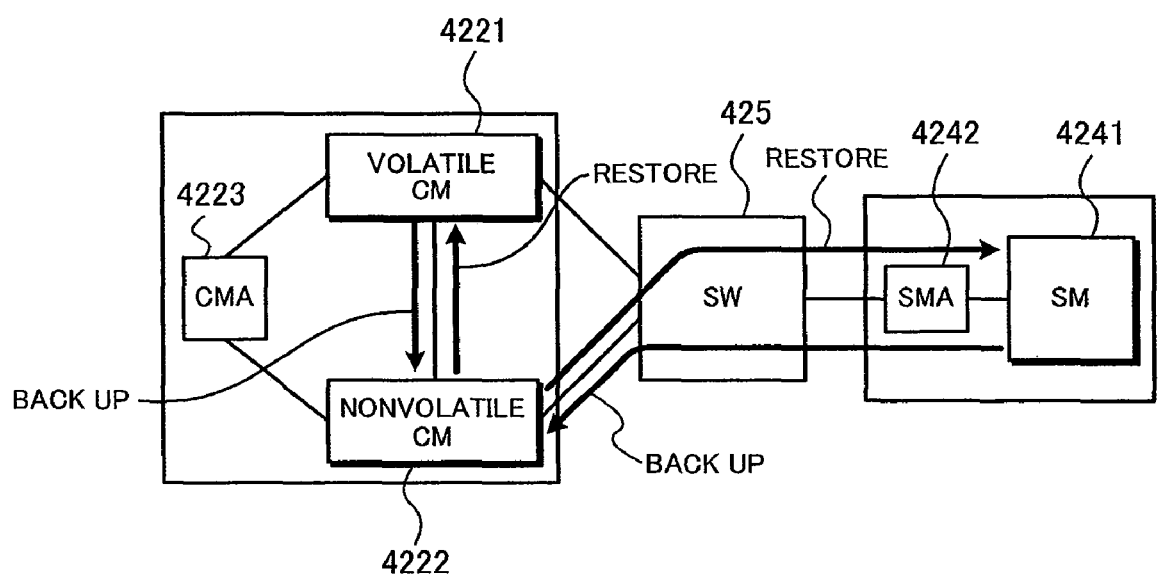
FIG. 11 is a diagram explaining backup/restoration processing in a storage apparatus according to an embodiment of the present invention.

FIG. 11 is a diagram explaining the backup/restoration processing in the storage apparatus 4 according to an embodiment of the present invention. FIG. 11 focuses on the portion concerning the backup/restoration processing among the configuration of the storage apparatus 4 illustrated in FIG. 2. Further, redundant configuration is omitted in order to simplify the diagram.

Referring to FIG. 11, when an unexpected power shutdown is detected in the storage apparatus 4, for example, electrical supply source is switched to the secondary power source, and an interrupt signal is given to the cache memory adapter 4223 and the shared memory adapter 4242. The cache memory adapter 4223 and the shared memory adapter 4242 that detected the interrupt signal perform backup processing according to a predetermined control sequence.

Specifically, the cache memory adapter 4223 backs up the dirty data cached in the volatile cache memory 4221 to the nonvolatile cache memory 4222 on one hand, and the shared memory adapter 4242 backs up the various types of information in the shared memory 4241 to the nonvolatile cache memory 4222. The cache memory adapter 4223 may refer to the shared memory 4241 and recognize which data in the volatile cache memory 4221 is dirty. Alternatively, the cache memory management information of the data to be backed up can be set as a parameter in the cache memory adapter 4223 when performing backup.

Further, when the power shutdown is restored and the storage apparatus 4 is thereafter re-booted and a restoration request is given, the cache memory adapter 4223 and the shared memory adapter 4242 perform restoration processing according to a predetermined control sequence.

Specifically, the shared memory adapter 4242 restores the various types of information backed up in the nonvolatile cache memory 4221 to the shared memory 4241. Subsequently, the cache memory adapter 4223 restores data that was backed up to the volatile cache memory 4221 according to the contents of the restored shared memory 4241.

Figure 12:
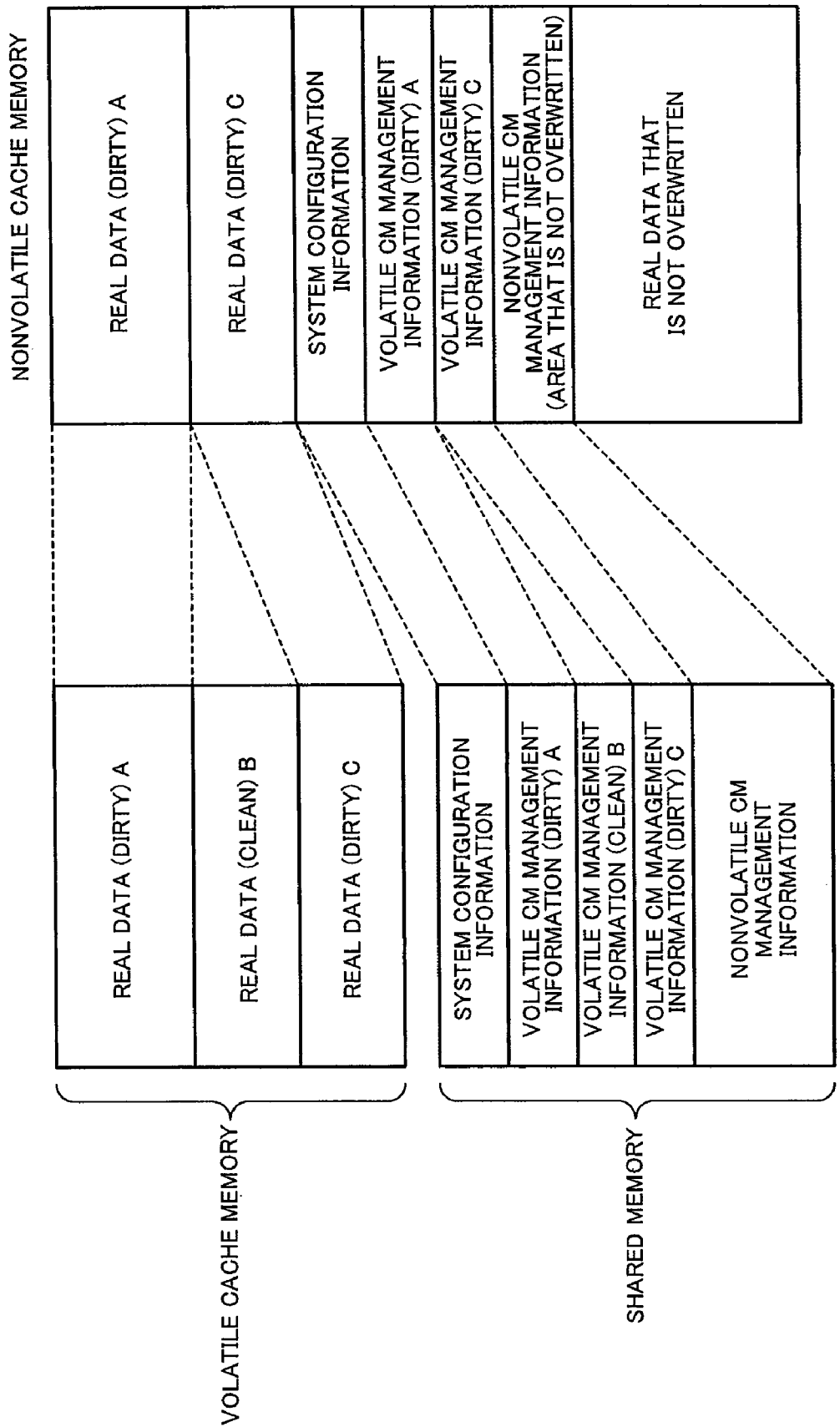
FIG. 12 is a diagram explaining a correspondence relationship of contents of the respective memories at the time of backup processing in a storage apparatus according to an embodiment of the present invention.

FIG. 12 is a diagram explaining the correspondence relationship of contents of the respective memories at the point in time of backup processing in the storage apparatus 4 according to an embodiment of the present invention. In this example, the volatile cache memory 4221 holds real data, and the shared memory 4241 holds system configuration information and cache memory management information.

As described above, in emergency situations, only the dirty data (in other words read data A and C) among the real data in the volatile cache memory 4221 are backed up in the nonvolatile cache memory 4222, and the clean data (in other words, real data B) is not backed up. Thus, among the various types of information in the shared memory 4241, the volatile cache memory management information concerning the clean data that is not backed up in the volatile cache memory 4221 will not be backed up.

Nevertheless, the nonvolatile cache memory management information in the shared memory 4241 is preferably backed up in the nonvolatile cache memory 4222 from the perspective of speeding up the restoration processing. In other words, because the data in the nonvolatile cache memory 4222 is clean data, it can be reconstructed using the data in the disk drive 41 even if it is overwritten and lost, and, if available data remains in the nonvolatile cache memory 4222, it is possible to minimize the data to be read from the disk drive 41 during the restoration processing based on the restoration request. In a sense of this, the memory size (S) of the nonvolatile cache memory 4222 to be used during backup processing should preferably be at least greater than the sum of the memory size (S1) of the volatile cache memory 4221, and the memory size (S2−S21) obtained by deducting the size (S21) of the nonvolatile cache memory management information from the memory size (S2) of the shared memory 4241 (S≧S1+S2−S21).

More preferably, among the nonvolatile cache memory management information in the shared memory 4241, the nonvolatile cache memory management information regarding the real data in the nonvolatile cache memory 4222, which is not overwritten with the backup data from the volatile cache memory 4221, is backed up in the nonvolatile cache memory 4222. By this, since a part of the real data will not be overwritten and remain in the nonvolatile cache memory 4222 after the backup processing, the foregoing real data that was not overwritten can be used immediately as cache data by restoring the nonvolatile cache memory management information of such real data that was not overwritten to the shared memory 4241.

If the nonvolatile cache memory 4222 is mirrored as in this embodiment, data may be mirrored and backed up in the nonvolatile cache memory 4222, or data can be suitably distributed and backed up. Further, when one nonvolatile cache memory 4222 becomes full with backup data, data may be backed up in the subsequent nonvolatile cache memory 4222.

Figure 13:
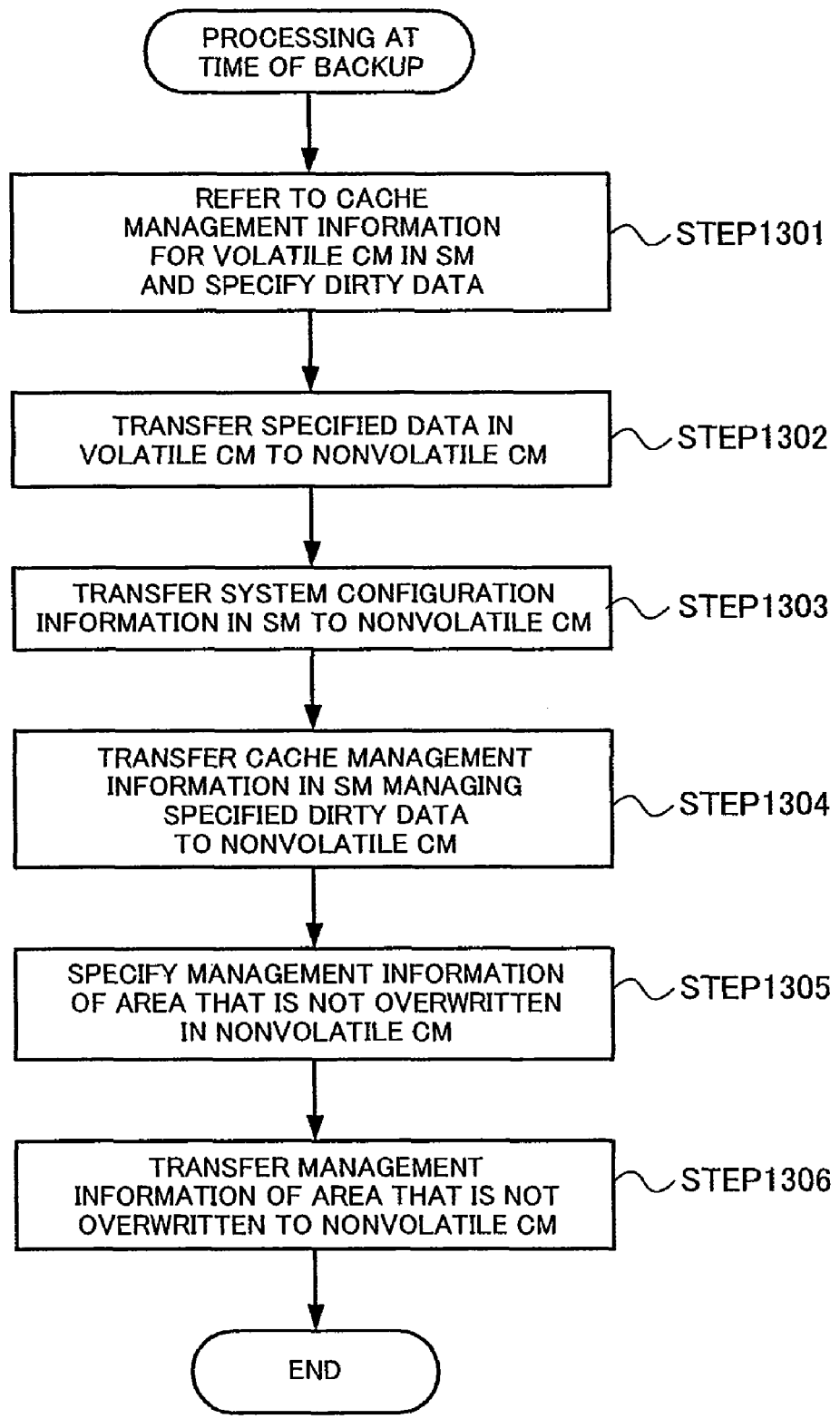
FIG. 13 is a flowchart explaining backup processing in a storage apparatus according to an embodiment of the present invention.

FIG. 13 is a flowchart explaining the backup processing in the storage apparatus 4 according to an embodiment of the present invention.

As described above, when the power shutdown is detected in the storage apparatus 4, for example, the electrical power supply is switched to the secondary power source, and an interrupt signal is given to the cache memory adapter 4223 and the shared memory adapter 4242. The cache memory adapter 4223 and the shared memory adapter 4242 that detected the interrupt signal perform the following backup processing according to the predetermined control sequence.

Specifically, as shown in FIG. 13, the cache memory adapter 4223 refers to the cache management information for the volatile cache memory in the shared memory 4241, and specifies the real data (dirty data) in a dirty state in the volatile cache memory 4221 (STEP 1301). Subsequently, the cache memory adapter 4223 transfers the specified dirty data in the volatile cache memory 4221 to the nonvolatile cache memory 4222 (STEP 1302). In this case, the cache memory adapter 4223 writes the transferred dirty data in the top area of the nonvolatile cache memory 4222.

Subsequently, the shared memory adapter 4242 transfers the system configuration information in the shared memory 4241 to the nonvolatile cache memory 4222 (STEP 1303). In this case, the shared memory adapter 4242 writes the system configuration information to be transferred from the area subsequent to the last area in which the transferred dirty data was written. The, the shared memory adapter 4242 transfers the volatile cache memory management information in the shared memory 4241 regarding the specified dirty data to the nonvolatile cache memory 4222 (STEP 1304).

Further, the shared memory adapter 4242 specifies an area that will not be overwritten in the nonvolatile cache memory 4222 as a result of the foregoing processing, and specifies the nonvolatile cache memory management information for managing the specified area (STEP 1305). Then, the shared memory adapter 4242 transfers the specific nonvolatile cache memory management information in the shared memory 4241 to the nonvolatile cache memory 4222 (STEP 1306). Here, considering that a part of the area that was not overwritten with dirty data or the like will be later overwritten with the nonvolatile cache memory management information transferred from the shared memory 4241, preferably, the area that is not overwritten and its nonvolatile cache memory management information are specified. Alternatively, preferably, the area that is not overwritten is specified by giving sufficient consideration to an area in advance for writing the nonvolatile cache memory management information.

Further, it is desirable to create backup configuration information describing the contents of the sequential backup processing in the nonvolatile cache memory 4222. Alternatively, this may be configured as a part of the system configuration information. The backup configuration information includes address information of the original memory that retained the backup data and information. Namely, if it is real data that was backed up, then it is address information in the volatile cache memory 4222 to which such real data was cached. Further, if it is system configuration information or cache management information that was backed up, then it is address information in the shared memory 4241 to which such information was written. The backup configuration information is written in a predetermined area (for instance, the last area) of the nonvolatile cache memory 4222.

By way of this, during restoration processing, the cache memory adapter 4223 will be able to reliably restore the data and information backed up in the nonvolatile cache memory 4222 to the original location (in other words, the volatile cache memory 4221 or the shared memory 4241) by foremost referring to the backup configuration information.

Figure 14:
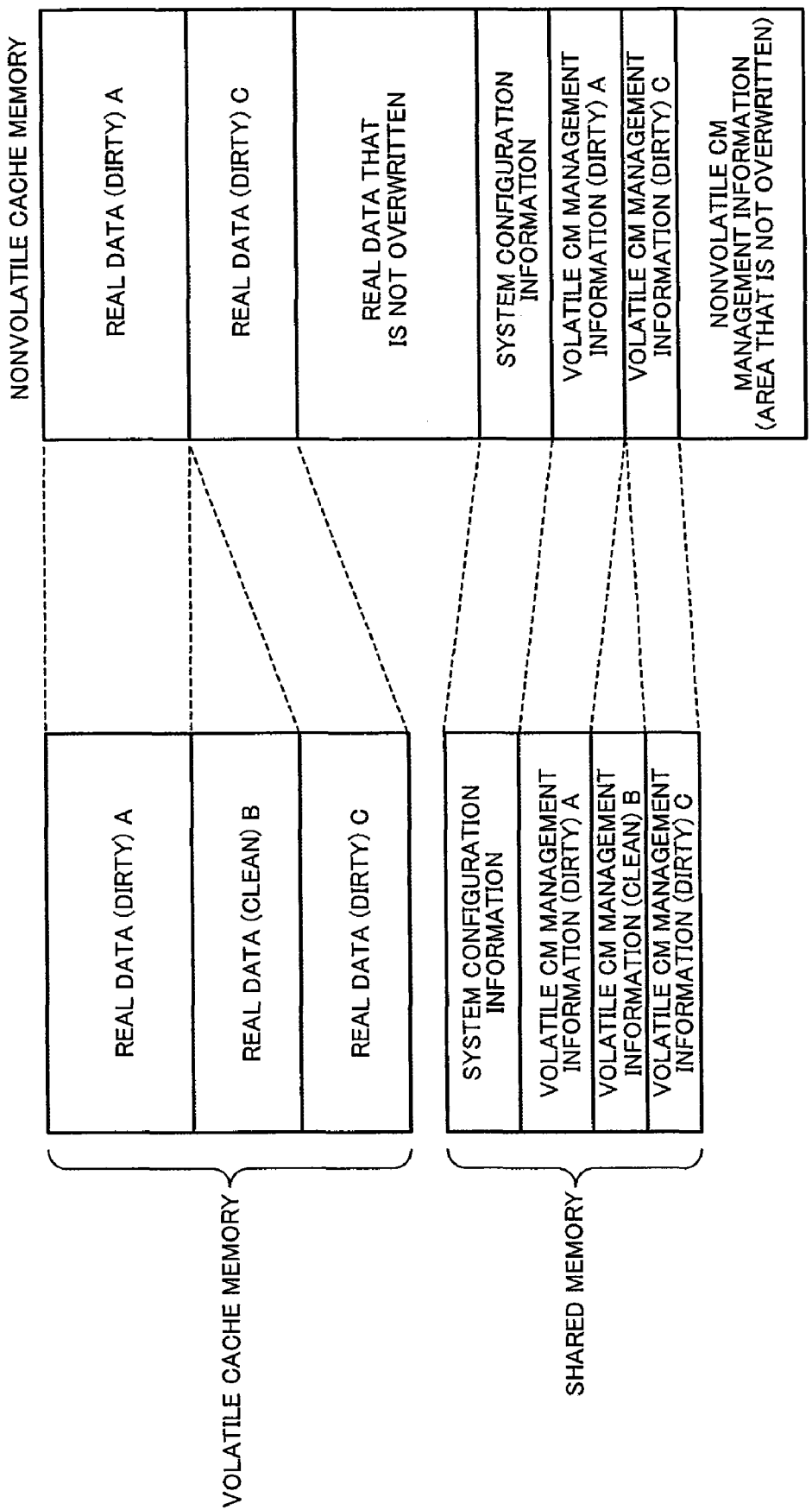
FIG. 14 is a diagram explaining a correspondence relationship of contents of the respective memories at time of backup processing in a storage apparatus according to an embodiment of the present invention.

FIG. 14 is a diagram explaining the correspondence of contents of the respective memories at the point in time of backup processing in the storage apparatus 4 according to an embodiment of the present invention. In this embodiment, the storage apparatus 4 is configured to retain the nonvolatile cache memory management information not in the shared memory 4241, but in itself nonvolatile cache memory 4222.

When the nonvolatile cache memory 4222 stores the nonvolatile cache memory management information thereof, there is a possibility that the nonvolatile cache memory management information regarding the overwritten data may remain regardless of the area of real data being overwritten based on the backup processing.

Accordingly, after the cache memory adapter 4223 backs up the data and information from the volatile cache memory 4221 and the shared memory 4241 to the nonvolatile cache memory 4222, the cache memory adapter 4223 specifies the area of such unusable nonvolatile cache memory management information, and invalidates the specified area.

Figure 15:
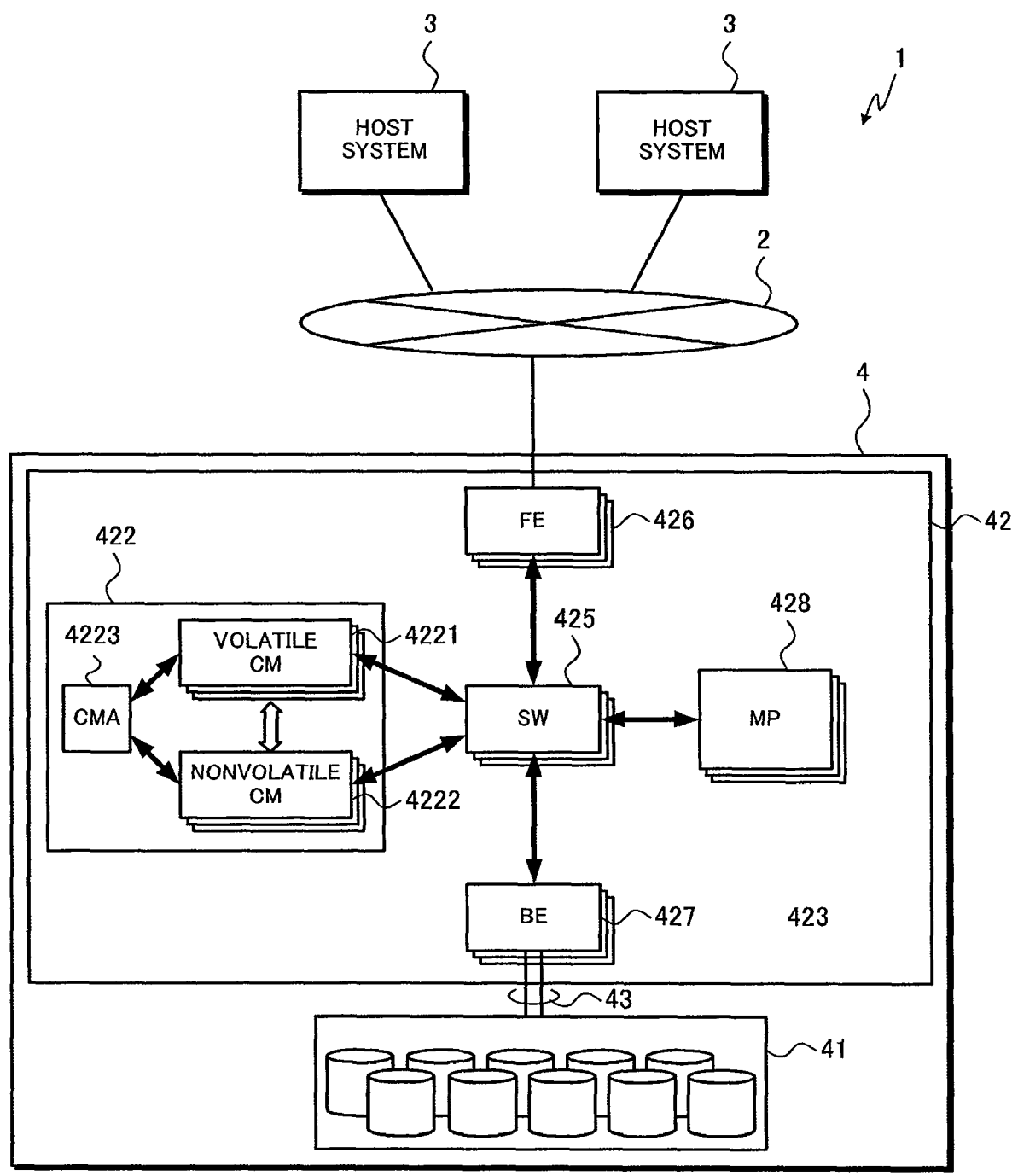
FIG. 15 is a diagram showing a configuration of a storage apparatus according to an embodiment of the present invention.

FIG. 15 is a diagram showing a configuration of the storage apparatus 4 according to another embodiment of the present invention. In FIG. 15, the constituent elements that are the same as the foregoing embodiment are given the same reference numeral.

As shown in FIG. 15, the storage apparatus 4 of this embodiment comprises a front-end 426 including an interface board for connection to the host system 3, a back-end 427 including an interface board for connection to the disk drive 41, and a microprocessor (MP) 428 for controlling the respective modules in the storage apparatus 4. Namely, the channel adapter 421 and the disk adapter 423 of the foregoing embodiment respectively correspond to the front-end 426 and the back-end 427 of this embodiment, and this embodiment differs from the foregoing embodiment in that the independently provided microprocessor 428 controls the foregoing components. Further, the storage apparatus 4 of this embodiment does not comprise a shared memory board 424. In the foregoing embodiment, the various types of information retained in the shared memory 4241 are retained in the volatile cache memory 4221 in this embodiment.

In the storage apparatus 4 having the above configuration, in emergency situations such as an unexpected power shutdown, the cache memory adapter 4223 backs up the dirty real data and various types of information (e.g., system configuration information and cache management information) stored in the volatile cache memory 4221 in the nonvolatile cache memory 4222. In this embodiment, because there is no shared memory 4241, the backup processing is achieved simply by the data and various types of information in the volatile cache memory 4221 being transferred to the nonvolatile cache memory 4222.

Figure 16:
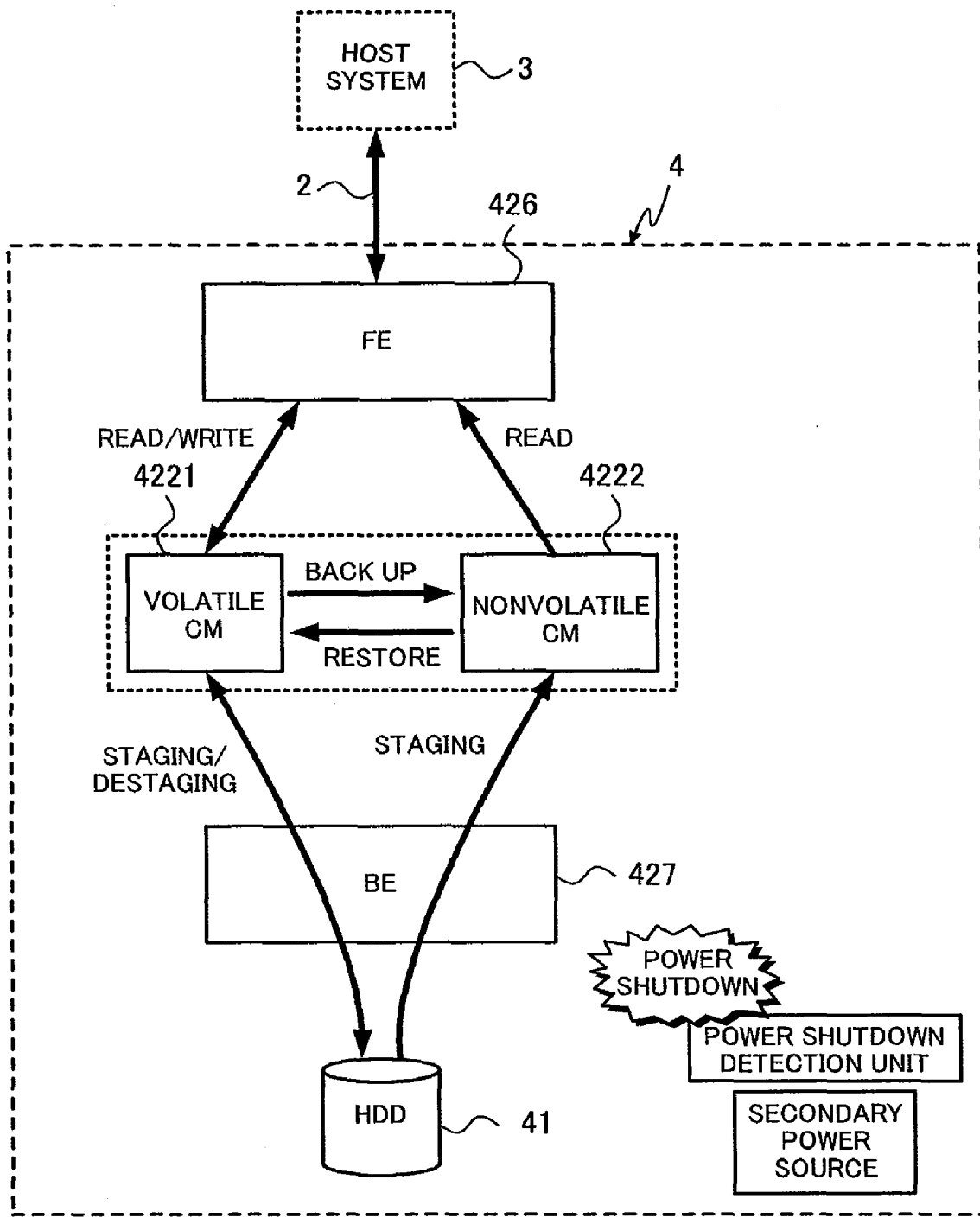
FIG. 16 is a conceptual diagram illustrating the backup/restoration mechanism of data in a storage apparatus according to an embodiment of the present invention.

FIG. 16 is a conceptual diagram explaining the backup/restoration mechanism of data in the storage apparatus 4 according to an embodiment of the present invention.

Figure 17:
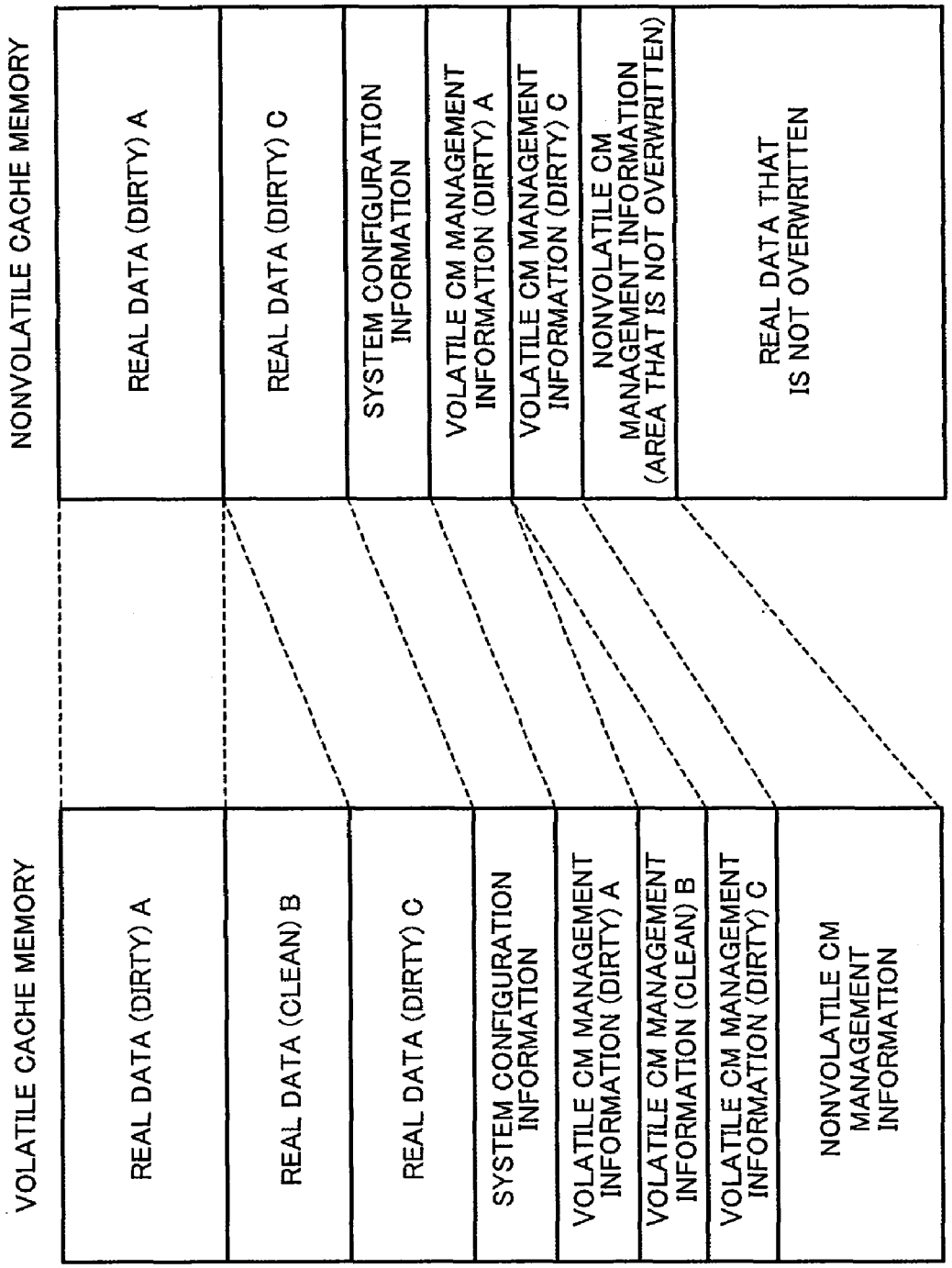
FIG. 17 is a diagram explaining a correspondence relationship of contents of the respective memories at the time of backup processing in a storage apparatus according to an embodiment of the present invention.

In the operation of the storage apparatus 4, if a power shutdown occurs, the storage apparatus 4 backs up the data and management information written in the volatile cache memory 4221 to the nonvolatile cache memory 4222. The backup process is executed by a cache memory adapter (not shown) managing the cache memory mechanism. Data to be backed up will be the dirty data and various types of information written in the volatile cache memory 4221. Accordingly, the correspondence of contents of the respective memories during backup processing will be, for instance, as shown in FIG. 17.

When the situation of a power shutdown is recovered, the storage apparatus 4 restores the data and various types of information backed up to the nonvolatile cache memory 4222 to the volatile cache memory 4221 and the shared memory 4241, respectively. By way of this, the storage apparatus 4 is restored to its status at the point in time the power shutdown occurred, thereby providing I/O service to the host system 3.

Figure 18:
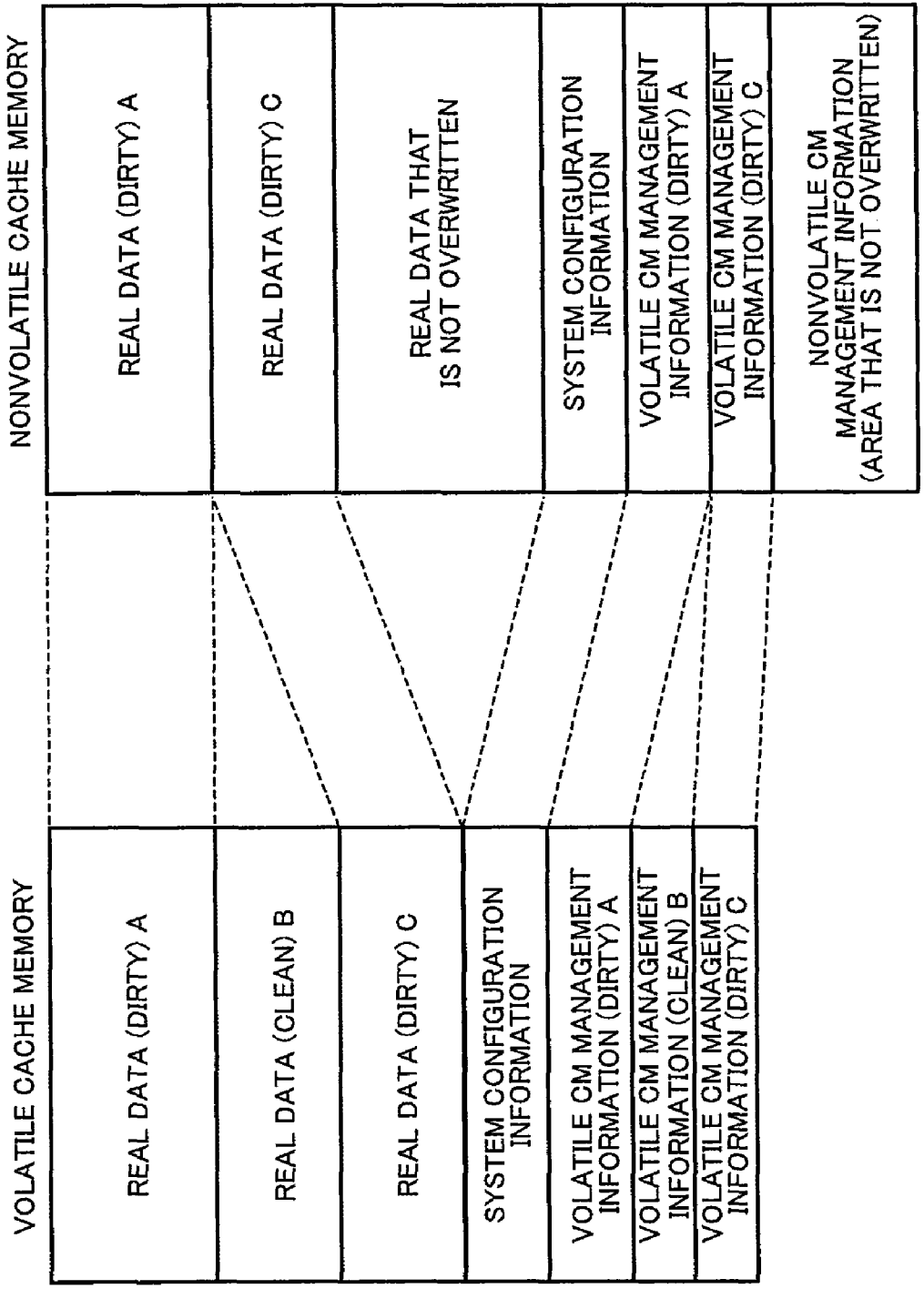
FIG. 18 is a diagram explaining a correspondence relationship of contents of the respective memories at the time of backup processing in a storage apparatus according to an embodiment of the present invention.

Further, FIG. 18 is a diagram explaining the correspondence of contents of the respective memories at the point in time of backup processing in the storage apparatus 4 according to a modified example of the other embodiment of the present invention. In this example, the volatile cache memory 4221 retains real data and various types of information, and the nonvolatile cache memory 4222 retains nonvolatile cache memory management information. In this case also, after the cache memory adapter 4223 backs up the data and information from the volatile cache memory 4221 to the nonvolatile cache memory 4222, the cache memory adapter specifies the area of nonvolatile cache memory management information regarding the real data in the nonvolatile cache memory 4222 that became unusable due to the overwriting, and invalidates the specified area.

Another embodiment according to the present invention will be explained below.

In this embodiment, data according to the foregoing attributes are aggregated in a specific virtual device among a plurality of RAID groups (virtual devices) respectively configured from one or more disk drives 41, all data in the specific virtual device are staged to the nonvolatile cache memory 4222, and the power supply to the specific virtual device is voluntarily stopped. Stopping the power supply not only refers to the status where the power supply is zero, and, for instance, is used in a broad sense including cases where minimum power is supplied such as in a sleep state.

By way of this, it is possible to reduce the amount of power supply to the disk drive 41, and reduce the power consumption of the overall storage apparatus 4.

Although the following explanation will be based on a virtual device having a RAID configuration, the same explanation can be applied to cases where one virtual device is considered to be one disk drive 41.

Figure 19:
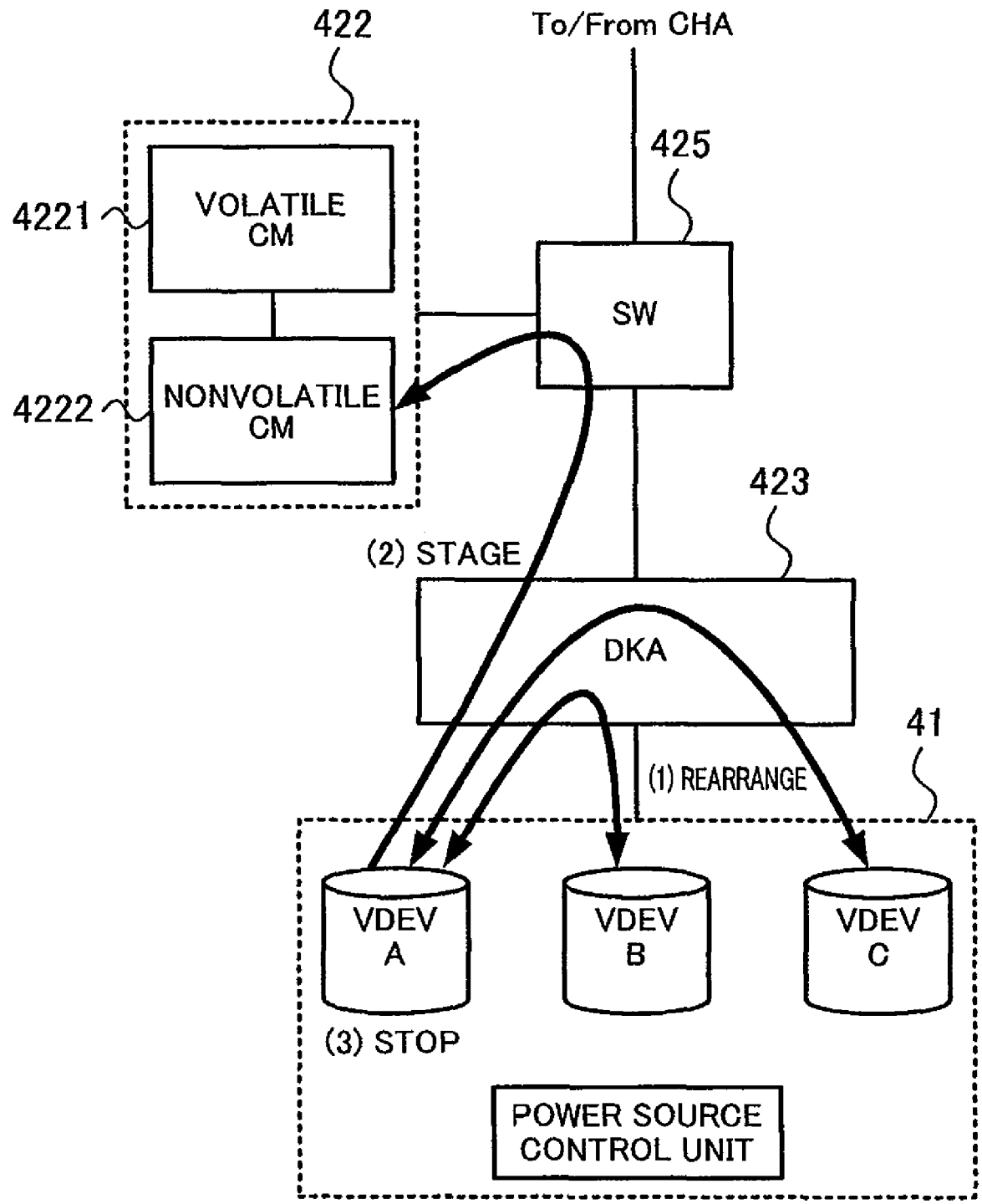
FIG. 19 is a conceptual diagram explaining a power consumption reduction mechanism in a storage apparatus according to an embodiment of the present invention.

FIG. 19 is a conceptual diagram explaining the power consumption reduction mechanism in the storage apparatus 4 according to the other embodiment of the present invention. FIG. 19, among the configurations of the storage apparatus 4 described above, focuses on the portion concerning power consumption reduction processing. Further, redundant configuration is omitted in order to simplify the diagram. In FIG. 19, although a configuration of controlling the disk drive 41 with a disk adapter 423 is adopted, the configuration may also be such that the disk drive 41 is controlled with a back-end 427.

Foremost, among the data stored in the virtual devices A through C, the disk adapter 423 optimally rearranges the data with a high frequency value in the virtual device A (FIG. 19(1)). Namely, among the data stored in the virtual devices B and C, the data with a high frequency value is migrated to the virtual device A, and, among the data stored in the virtual device A, the data with a low frequency value are migrated to the virtual device B or C. Whether the frequency value is high or low can be determined by setting a prescribed threshold value, and checking whether the frequency value is greater than or less than the threshold value.

Subsequently, when the data stored in the virtual device A are filled with data having a high frequency value, the disk adapter 423 stages all data rearranged in the virtual device A to the nonvolatile cache memory 4222 (FIG. 19(2)).

Then, the disk adapter 423 issues a command to the disk drive 41 to stop the power supply to the virtual device A, and, in response thereto, the power source control unit in the disk drive 41 stops the power supply to the virtual device A (FIG. 19(3)).

It is noted that the stopped virtual device A is aggregated with data having a high frequency of read requests. Thus, the possibility that a write request to such data will be given is low. Nevertheless, in the operation of the storage apparatus 4, when an access request from the host system 3 is given to the data stored in the stopped virtual device A, this situation can be handled by re-booting (spinning up) the virtual device A.

Figure 20:
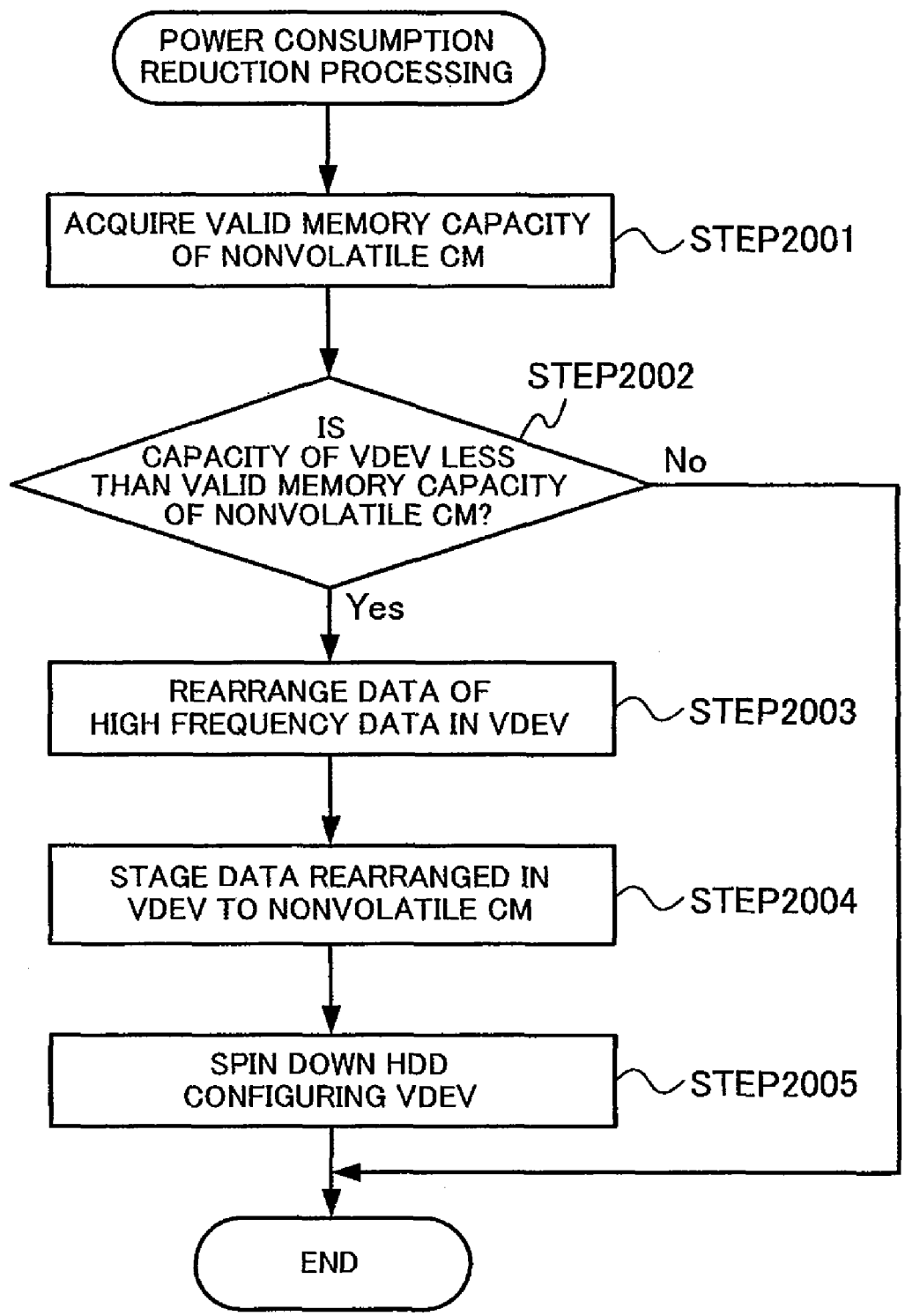
FIG. 20 is a flowchart explaining power consumption reduction processing in a storage apparatus according to an embodiment of the present invention.

FIG. 20 is a flowchart explaining the power consumption reduction processing in the storage apparatus 4 according to the other embodiment of the present invention. The power consumption reduction processing is executed by the disk adapter upon receiving a command from the system administrator, or at a prescribed timing.

Specifically, the disk adapter 423 acquires the current valid memory capacity of the nonvolatile cache memory 4222 (STEP 2001). A valid memory capacity is the total capacity of areas actually available in the nonvolatile cache memory 4222. Namely, because areas in which the write count has reached the upper limit and areas subject to an error are excluded from availability, the capacity obtained by deducting the capacity of such areas from the initial capacity of the nonvolatile cache memory 4222 is the valid memory capacity. The valid memory capacity may be retained as a part of the system configuration information in the shared memory 4241.

Subsequently, the disk adapter 423 determines whether the capacity of a certain virtual device is less than the valid memory capacity of the nonvolatile cache memory 4222 or not (STEP 2002). When it is determined that the capacity of a certain virtual device is not less than the valid memory capacity of the nonvolatile cache memory 4222 (STEP 2002; No), the disk adapter 423 ends the processing because it is not a virtual device that can be spun down with the power consumption reduction processing.

In contrast, when it is determined that the capacity of a certain virtual device is less than the valid memory capacity of the nonvolatile cache memory 4222 (STEP 2002; Yes), the disk adapter 423 extracts data in which the frequency value is exceeding a prescribed threshold value among the data stored in the respective virtual devices, and rearranges such data in the virtual device (STEP 2003). Specifically, among the data stored in the other virtual devices, data with a high frequency value is migrated to the virtual device, and, among the data stored in the virtual device, data with a low frequency value is migrated to another virtual device. Thereby, data with a high frequency value will be aggregated in the virtual device.

After rearranging the data, the disk adapter 423 stages all data rearranged in the virtual device to the nonvolatile cache memory 4222 (STEP 2004). Then, the disk adapter 423 issues a command to the disk drive 41 to stop the power supply in order to spin down the disk drive 41 configuring the virtual device (STEP 2005). In response to this command, the disk drive 41 stops the power supply to the designated disk drive 41.

Although one virtual device is spun down in the foregoing example, so as long as the nonvolatile cache memory 4222 has memory capacity, the foregoing processing may be performed to a plurality of virtual devices.

The present invention can be broadly applied to storage apparatuses adopting a cache memory.

What is claimed is:

1. A storage apparatus comprising:
a disk drive having a storage medium for storing a plurality of data sets; and
a disk controller configured to control the disk drive, wherein the disk controller comprises:
a host interface configured to receive an I/O request from a host system;
a disk interface operatively connected to the disk drive; and
a cache mechanism operatively connected to the host interface and the disk interface and having a first cache memory configured from a volatile memory and a second cache memory configured from a nonvolatile memory,
wherein the disk controller is configured to manage a plurality of attribute values associated with the plurality of data sets stored in the disk drive,
wherein the plurality of attribute values are values based on a frequency of the access request to the data set,
wherein, when the access request is a read request, the disk controller increases the attribute value associated with the data set according to the read request,
wherein, when the access request is a write request, the disk controller decreases the attribute value associated with the data set according to the write request,
wherein the disk interface writes one or more first data sets specified from the plurality of data sets stored in the disk drive into the second cache memory based on the plurality of attribute values, and
wherein, in accordance with a backup request, the disk controller transfers a second data set specified from the first data sets written in the first cache memory to the second cache memory.

2. The storage controller according to claim 1, wherein the disk controller specifies, from the one or more first data sets written in the first cache memory, one data set, as the second data set, where contents of the one data set in the first cache memory are inconsistent with contents of a corresponding data set stored in the disk drive to the one data set.

3. The storage controller according to claim 1, wherein the disk controller further comprises a shared memory configured from a volatile memory,
wherein the shared memory is configured to store first cache memory management information for managing the first cache memory, and
wherein, in accordance with the backup request, the disk controller transfers the first cache memory management information stored in the shared memory to the second cache memory.

4. The storage controller according to claim 3, wherein the shared memory is configured to store second cache memory management information for managing the second cache memory, and
wherein, in accordance with the backup request, the disk controller transfers the second cache memory management information stored in the shared memory to the second cache memory.

5. The storage controller according to claim 1, wherein, when the access request is a write request, the host interface writes a data set according to the write request into the first cache memory without writing the data set into the second cache memory.

6. The storage controller according to claim 1, wherein, when the access request is a read request and a data set according to the read request does not exist in either the first cache memory or the second cache memory, the disk interface reads the data set according to the read request from the disk drive and then writes the data set into either the first cache memory or the second cache memory.

7. The storage controller according to claim 5, wherein, when the access request is a write request and a corresponding data set to the data set according to the write request exists in the second cache memory, the host interface invalidates the data set existing in the second cache memory.

8. The storage apparatus according to claim 1, wherein the disk controller decreases the attribute value of a data set to which the access request is not given for a prescribed period of time.

9. The storage apparatus according to claim 8, wherein the disk interface specifies a data set that does not exist in the second cache memory, which has the highest attribute value and which is stored in the disk drive as the first data set, and writes the data set into the second cache memory.

10. The storage apparatus according to claim 1, wherein the first cache memory is configured to store first cache memory management information for managing the first cache memory, and wherein, in accordance with the backup request, the disk controller transfers the first cache memory management information stored in the first cache memory to the second cache memory.

11. The storage apparatus according to claim 1, wherein the disk controller restores the second data set transferred from the second cache memory in accordance with the backup request to the first cache memory.

12. A method of managing data in a storage apparatus including a disk drive having a storage medium for storing a plurality of data sets, and a disk controller configured to control the disk drive, the method comprising:

providing a first cache memory configured from a volatile memory and a second cache memory configured from a nonvolatile memory;

giving attribute values to the plurality of data sets, respectively, stored in the disk drive, wherein the attribute values are values based on a frequency of the access request to the data set;

increasing, when the access request is a read request, the attribute value associated with the data set according to the read request;

decreasing, when the access request is a write request, the attribute value associated with the data set according to the write request;

writing a first data set in the first cache memory;

specifying a second data set from the plurality of data sets stored in the disk drive based on the attribute values;

writing the specified data set into the second cache memory;

determining, upon receiving a write request from a host system, whether a corresponding data set to a data set according to the write request has been written as the second data set into the second cache memory;

invalidating an area in which the second data set was written in the second cache memory when it is determined that the corresponding data set to the data set according to the write request has been written as the second data set into the second cache memory;

writing an alternative data set to be specified based on the attribute values into the invalidated area in the second cache memory; and transferring, in accordance with a backup request, the first data set written into the first cache memory to the second cache memory.

13. A method of managing data in a storage apparatus including a plurality of disk drives having a storage medium for storing a data set, and a disk controller configured to control the plurality of disk drives, the method comprising:

storing different data sets to each of the plurality of disk drives;

giving attribute values to each of the data sets;

rearranging the data sets in the plurality of disk drives based on the given attribute values;

specifying at least one disk drive among the plurality of disk drives;

writing all of the data sets rearranged in the at least one specified disk drive into a cache memory configured from a nonvolatile memory; and stopping power delivery to the at least one specified disk drive.

* * * * *